(12) United States Patent
Gornik

(10) Patent No.: US 10,182,214 B2
(45) Date of Patent: Jan. 15, 2019

(54) SYSTEMS AND METHODS FOR AGRICULTURAL MONITORING

(71) Applicant: A.A.A TARANIS VISUAL LTD, Tel Aviv (IL)

(72) Inventor: Amihay Gornik, Mishmar Hashiva (IL)

(73) Assignee: A.A.A. TARANIS VISUAL LTD, Tel Aviv (IL)

( * ) Notice: Subject to any disclaimer, the term of this patent is extended or adjusted under 35 U.S.C. 154(b) by 0 days.

(21) Appl. No.: 15/542,853

(22) PCT Filed: Dec. 2, 2015

(86) PCT No.: PCT/IL2015/051169
§ 371 (c)(1),
(2) Date: Jul. 11, 2017

(87) PCT Pub. No.: WO2016/110832
PCT Pub. Date: Jul. 14, 2016

(65) Prior Publication Data
US 2017/0374323 A1 Dec. 28, 2017

(30) Foreign Application Priority Data

Jan. 11, 2015 (IL) .......................... 236606

(51) Int. Cl.
*H04N 7/18* (2006.01)
*A01B 79/00* (2006.01)
(Continued)

(52) U.S. Cl.
CPC .......... *H04N 7/185* (2013.01); *A01B 79/005* (2013.01); *G06T 7/0004* (2013.01);
(Continued)

(58) Field of Classification Search
CPC .......... B64D 47/08; G06T 2207/10032; G06T 2207/30188; G06T 2207/30232; G06T 7/0004; A01B 79/005
See application file for complete search history.

(56) References Cited

U.S. PATENT DOCUMENTS 6,422,508 B1 * 7/2002 Barnes ...................... F41G 3/14
244/3.15
8,768,667 B2   7/2014 Robert
(Continued)

FOREIGN PATENT DOCUMENTS

CN       103523224    *  1/2014
CN       103523224  A   1/2014
(Continued)

OTHER PUBLICATIONS

Hyperspectral Kit goes airborne; (Year: 2013).*
(Continued)

*Primary Examiner* — Md N Haque
(74) *Attorney, Agent, or Firm* — Symbus Law Group, LLC; Clifford D. Hyra

(57) ABSTRACT

An agricultural monitoring system, the agricultural monitoring system comprising: an imaging sensor, configured and operable to acquire image data at submillimetric image resolution of parts of an agricultural area in which crops grow, when the imaging sensor is airborne; a communication module, configured and operable to transmit to an external system image data content which is based on the image data acquired by the airborne imaging sensor; and a connector operable to connect the imaging sensor and the communication module to an airborne platform.

14 Claims, 24 Drawing Sheets

(51) Int. Cl.
*G06T 7/00* (2017.01)
*H04N 5/232* (2006.01)
*A01B 79/02* (2006.01)
*B64D 47/08* (2006.01)

(52) U.S. Cl.
CPC ............ *H04N 5/2328* (2013.01); *A01B 79/02* (2013.01); *B64D 47/08* (2013.01); *G06T 2207/10032* (2013.01); *G06T 2207/30188* (2013.01); *G06T 2207/30232* (2013.01); *H04N 5/23248* (2013.01)

(56) References Cited

U.S. PATENT DOCUMENTS

| | | | |
|---|---|---|---|
| 9,265,192 B2 | 2/2016 | Chan et al. | |
| 9,752,932 B2 | 9/2017 | Adam | |
| 2012/0101796 A1* | 4/2012 | Lindores | G06F 17/30241 703/9 |
| 2014/0089045 A1* | 3/2014 | Johnson | G06Q 30/0205 705/7.31 |
| 2014/0312165 A1* | 10/2014 | Mkrtchyan | B64D 47/08 244/13 |
| 2014/0316614 A1* | 10/2014 | Newman | G06Q 30/0611 701/3 |
| 2014/0354996 A1* | 12/2014 | Fontecchio | G02F 1/13342 356/416 |
| 2014/0365084 A1 | 12/2014 | Chan et al. | |

FOREIGN PATENT DOCUMENTS

| | | |
|---|---|---|
| CN | 103523224 U1 | 1/2014 |
| DE | 202014002338 A | 5/2014 |
| DE | 202014002338 U1 | 5/2014 |
| DE | 202014002338 * | 7/2014 |

OTHER PUBLICATIONS

"Hyperspectral kit goes airborne" http://optics.org/news/4/7/12 Ocean Optics.
"Remote Sensing Technology Trends and Agriculture" https://dg-cms-uploads-production.s3.amazonaws.com/uploads/document/file/31/DG-RemoteSensing-WP.pdf Digital Globe.
International Search Report dated Jun. 10, 2016 issued for WO2016110832 A1.
"Hyperspectral kit goes airborne" (Ocean Optics) http://optics.org/news/4/7/12.
"Remote Sensing Technology Trends and Agriculture" (Digitalglobe). Retrieved from the Internet on Mar. 8, 2016. Jan. 20, 2015. URL: <https://www.digitalglobe.com/resources/white-papers>.
International Search Report and Written Opinion dated Jun. 10, 2016.

* cited by examiner

600

510 flying an airborne imaging sensor along a flight path over an agricultural area in which crops grow

520 acquiring by the airborne imaging sensor image data of parts of the agricultural area, at a set of imaging locations along the flight path which enable acquisition of the image data at submillimetric image resolution

530 processing the image data by an airborne processing unit, to provide image data content which includes high quality images of leaves of the crops

540 transmitting to an external system image data content which is based on the image data acquired by the airborne imaging sensor

510 flying an airborne imaging sensor along a flight path over an agricultural area in which crops grow 511 flying the airborne imaging sensor along a terrain following flight path 512 flying in velocities which exceed 10 m/s across each imaging location out of the set of imaging locations 513 flying the airborne imaging sensor along the imaging location of that imaging flight leg at velocities which do not fall below 50% of the average speed along that imaging flight leg.

514 flying the airborne imaging sensor by an agricultural aircraft which is configured for aerial application of crop protection products 540 transmitting to an external system image data content which is based on the image data acquired by the airborne imaging sensor 541 transmitting the image data content to the external system for displaying to an agronomist at a remote location agronomic image data which is based on the image data content, thereby enabling the agronomist to remotely analyze the agricultural area

FIG. 5B 520 acquiring by the airborne imaging sensor image data of parts of the agricultural area, at a set of imaging locations along the flight path which enable acquisition of the image data at submillimetric image resolution 521 acquiring image data at the set of imaging locations while flying the airborne imaging sensor along the imaging locations at velocities which do not fall below 50% of the average speed of the airborne platform along the flight path 522 mechanically moving at least one component of the airborne imaging sensor with respect to a carrying airborne platform, for compensating for the motion of the airborne imaging sensor with respect to the crops during the acquiring 523 illuminating the crops during the acquiring, for compensating for the motion of the airborne imaging sensor with respect to the crops during the acquiring 524 acquiring image data of parts of the agricultural area which are inaccessible to land vehicles.

525 acquiring image data of the agricultural area at a coverage rate of under 500 square meters per hectare 526 focusing the imaging sensor, prior to the collection of light by the imaging sensor

FIG. 5C

550 Processing the image data content or information based on it, to provide decision facilitating information 554 applying computerized processing algorithms to the image data content for detecting diseases in one or more plants in the agricultural area 555 determining health parameters for large scale level based on high resolution images of many individual plants in the agricultural area 556 processing image data acquired at different times over multiple weeks, for determining growth parameters for the plants in the agricultural area.

557 applying computerized processing algorithms to the image data for identifying selected agronomic significant data, and generating agronomic image data for transmission to a remote system based on the selected agronomic significant data.

558 applying computerized processing algorithms to the selected agronomic significant data for selecting, out of a plurality of possible recipients, a recipient for the agronomic image data, based on agronomic expertise of the possible recipients.

FIG. 5E

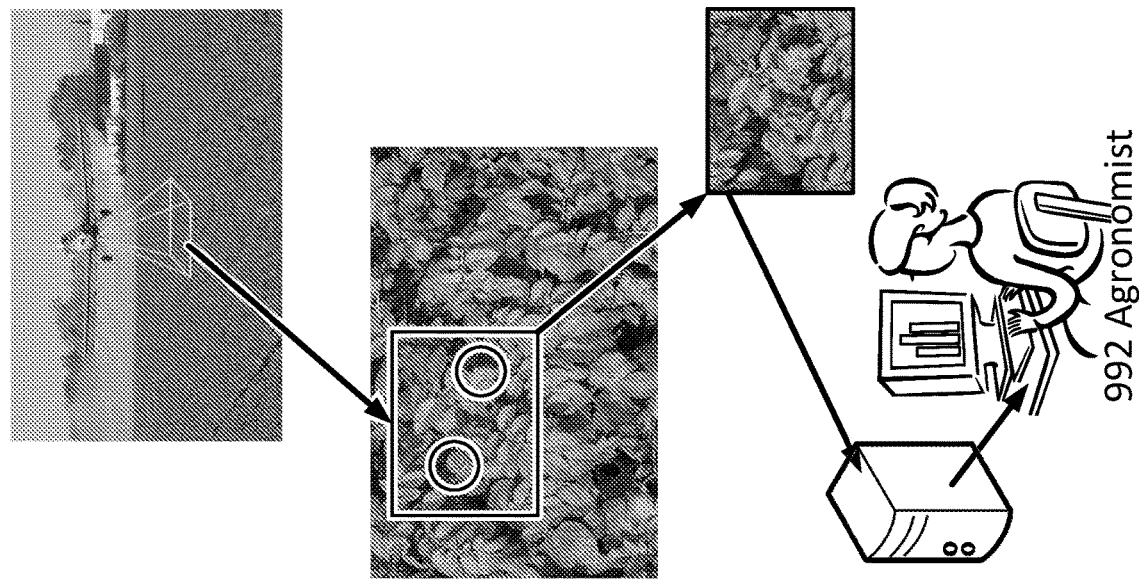

710 flying by an agricultural airplane an airborne digital camera over a potato field in which potatoes grow at velocities of between 10 and 15 m/s along a flight path which includes a plurality of low altitude imaging locations of about 40 feet above the crop level, which enable acquisition of the image data at submillimetric image resolution 720 acquiring by the airborne digital camera image data of parts of the potatoes field at submillimetric resolutions of about 0.4mm 730 processing the image data by an airborne processing unit carried onboard the agricultural airplane, to provide image data content which includes high quality images of leaves of the potatoes 740 wirelessly transmitting to an off-site remote server the image data content, for distribution to end-users, such as an agronomist

FIG. 6

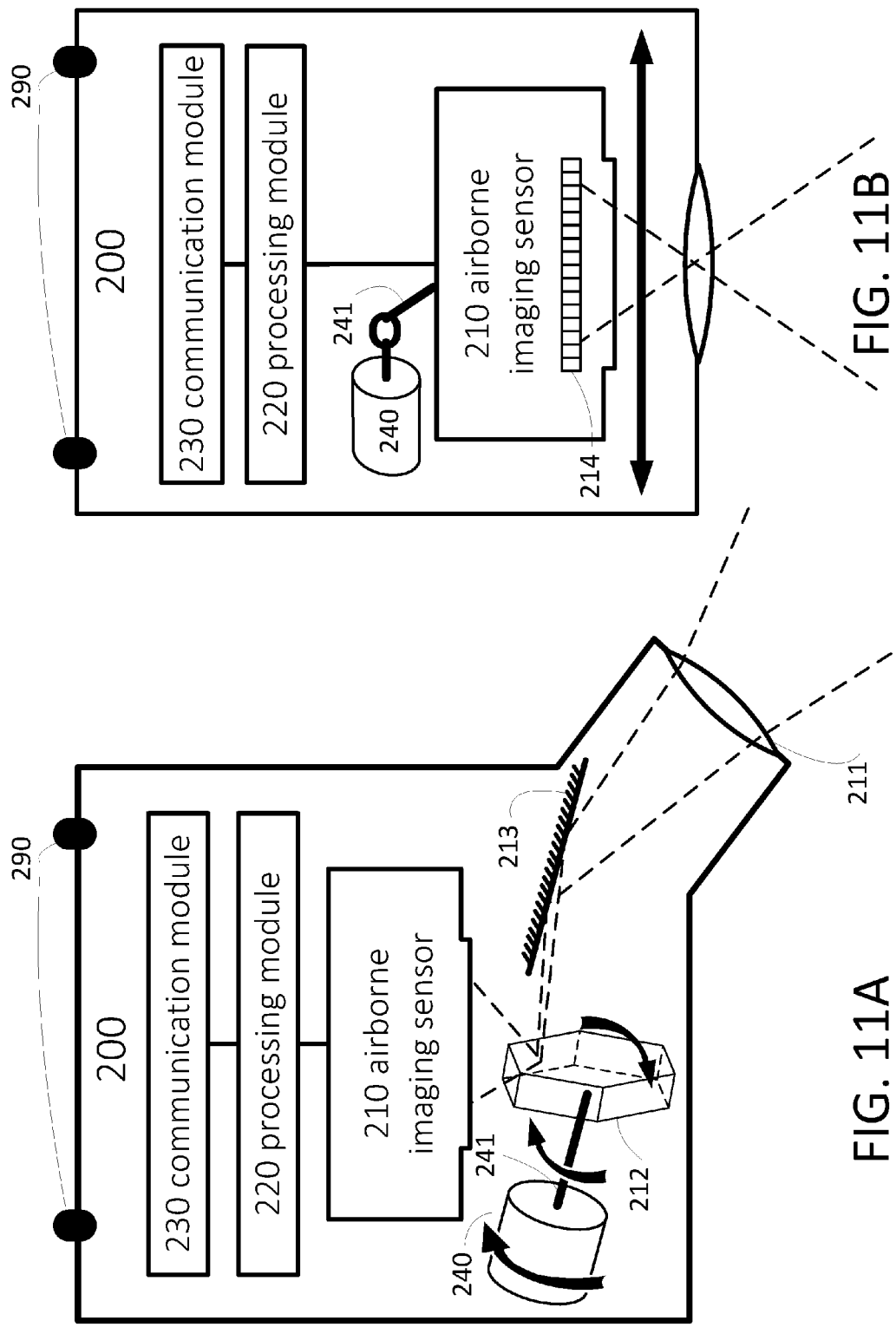

1000
1000
FIG. 13

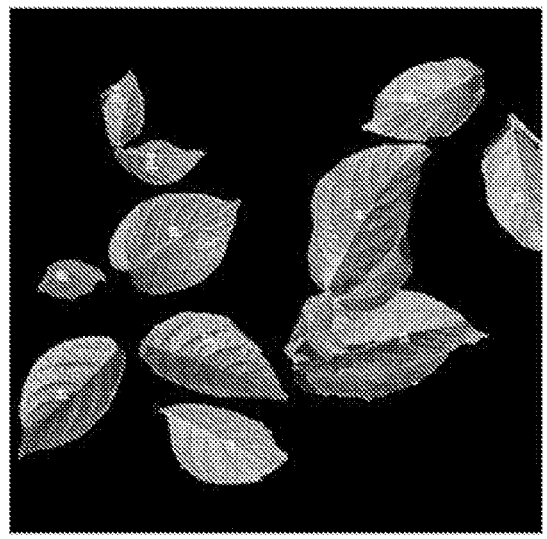
FIG. 14

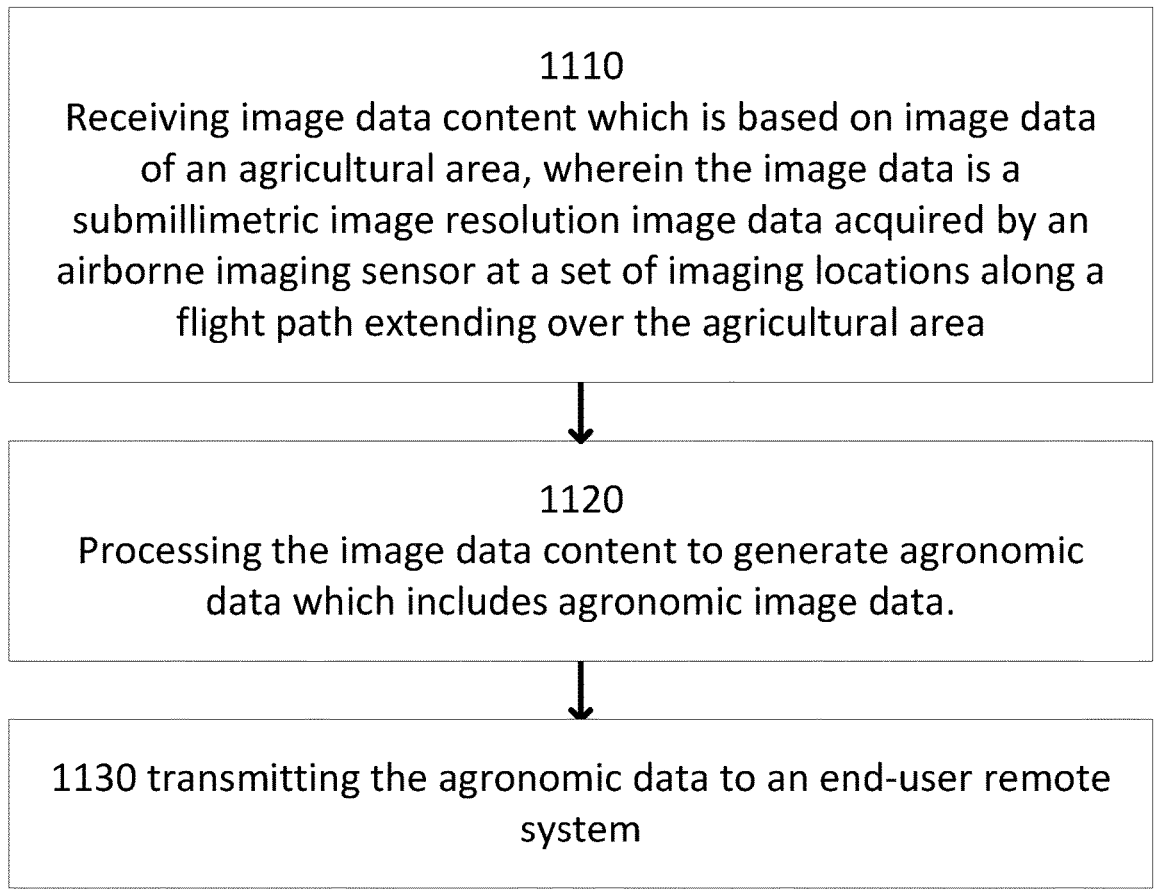
1100  FIG. 15
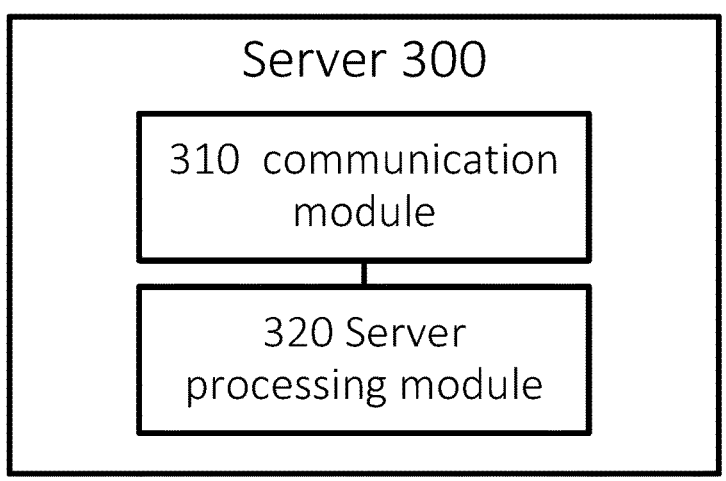
FIG. 16

SYSTEMS AND METHODS FOR AGRICULTURAL MONITORING

FIELD

The invention is related to systems, methods, and computer program products for agricultural monitoring, and more specifically to systems, methods and computer program products for agricultural monitoring which is based on image data acquired by an airborne imaging sensor.

BACKGROUND

Chinese utility model serial number CN203528823 entitled "Rice bacterial leaf blight preventing unmanned aerial vehicle with colored rice disease image identifier" relates to a rice bacterial leaf blight preventing unmanned aerial vehicle with a colored rice disease image identifier, and belongs to the technical field of agricultural aviation plant protection. The rice bacterial leaf blight preventing intelligent unmanned aerial vehicle flies over a rice field and detects occurrence of bacterial leaf blight, a camera and a video camera mounted in a photoelectric pod below the rice bacterial leaf blight preventing intelligent unmanned aerial vehicle input sensed colored rice disease images in the rice field to a colored rice disease image storage system for storage, next, the images are inputted to the colored rice disease image identifier and compared with stored colored rice disease standard images, disease types and harm situations are identified and confirmed, harm information of the bacterial leaf blight is inputted to a computer spraying treatment instruction information system for processing, a spraying treatment instruction is made, a pressure pump applies pressure to treatment chemical pesticide liquid according to the spraying treatment instruction, the pressurized chemical pesticide liquid is sprayed to the rice field by a bacterial leaf blight treatment chemical pesticide liquid sprayer.

Chinese utility model serial number CN203528822 entitled "Rice sheath blight disease preventing unmanned aerial vehicle with colored rice disease image identifier" relates to a rice sheath blight disease preventing unmanned aerial vehicle with a colored rice disease image identifier, and belongs to the technical field of agricultural aviation plant protection. A video camera and a camera mounted in a photoelectric pod below the rice sheath blight disease preventing intelligent unmanned aerial vehicle input sensed colored rice disease images in a rice field to a colored rice disease image storage system for storage, next, the images are inputted to the colored rice disease image identifier and compared with stored colored rice disease standard images, harm situations of rice sheath blight diseases are identified, harm information of the sheath blight diseases is inputted to a computer spraying treatment instruction information system for processing, a spraying treatment instruction transmitted by the computer spraying treatment instruction information system regulates pressure applied by a pressure pump to treatment chemical pesticide liquid through a spraying treatment instruction information transmission line, the pressurized chemical pesticide liquid is sprayed to the rice field by a sheath blight disease treatment chemical pesticide liquid sprayer by regulation.

Chinese patent application serial number CN103523226A entitled "Unmanned aerial vehicle with colorized rice disease image recognition instrument and for preventing and treating rice sheath blight diseases" relates to an unmanned aerial vehicle with a colorized rice disease image recognition instrument and for preventing and treating rice sheath blight diseases and belongs to the technical field of agricultural aviation plant protection. Colorized rice disease images in rice fields sensed by vidicons and cameras in a photoelectric pod below the intelligent unmanned aerial vehicle for preventing and treating the rice sheath blight diseases are input to a colorized rice disease image storage system to achieve storage, and then input to the colorized rice disease image recognition instrument to be compared with the stored colorized rice disease standard images to recognize hazard situations of the rice sheath blight diseases. The harmful information of the rice sheath blight diseases is input to a computer spray treatment command information system to achieve processing. Spray treatment commands sent by the computer spray treatment command information system control the pressure of a pressure pump on treatment chemical pesticide liquid through a spray treatment command information transmission line and control the pressurized chemical pesticide liquid to be sprayed to the rice fields through a sprayer containing the chemical pesticide liquid for treating the rice sheath blight diseases.

Japanese patent application serial number JPH11235124A entitled "Precise farming" discusses a method for precisely farming, capable of preventing the excessive or deficient application of fertilizers and pesticides, improving the application efficiencies of the fertilizers and the pesticides and increasing the yield of crops by detecting the crop growth state of a farm field to automatically form a crop growth map of the farm field and subsequently applying fertilizers, pesticides, etc., on the basis of the data of the formed crop growth map. The patent application discusses a method for precisely farming comprises aerially photographing the crop growth state of a farm field, for example, with a camera 70 loaded on a helicopter, detecting the chlorophyll contents of the crops from the images taken with the camera 70 of color sensor to detect the crop growth state of the farm field, and subsequently forming the crop growth map of the farm field U.S. patent application Ser. No. 11/353,351 entitled "Irrigation remote sensing system" discusses a data gathering device associated with an agricultural irrigation system including at least one camera movably connected to the irrigation system

General Description

According to an aspect of the invention, there is disclosed a method for agricultural monitoring, the method including: (a) flying an airborne imaging sensor along a flight path over an agricultural area in which crops grow; (b) acquiring by the airborne imaging sensor image data of parts of the agricultural area, wherein the acquiring of the image data is executed at a set of imaging locations along the flight path which enable acquisition of the image data at submillimetric image resolution; and (c) transmitting to an external system image data content which is based on the image data acquired by the airborne imaging sensor.

According to a further aspect of the invention, the method may include transmitting the image data content to the external system for displaying to an agronomist at a remote location agronomic image data which is based on the image data content, thereby enabling the agronomist to remotely analyze the agricultural area.

According to a further aspect of the invention, the flight path is a terrain following flight path.

According to a further aspect of the invention, the acquiring include acquiring image data at the set of imaging locations while flying the airborne imaging sensor along the imaging locations at velocities which do not fall below 50% of the average speed of the airborne platform along the flight path.

According to a further aspect of the invention, the acquiring includes mechanically moving at least one component of the airborne imaging sensor with respect to a carrying airborne platform, for compensating for the motion of the airborne imaging sensor with respect to the crops during the acquiring.

According to a further aspect of the invention, the acquiring includes: (a) mechanically rotating at least one optical component of the airborne imaging sensor with respect to a carrying airborne platform, for compensating for the motion of the airborne imaging sensor with respect to the crops during the acquiring; and (b) concurrently to the rotation of the at least one optical component, for each frame out of a plurality of frames of the image data: initiating a focusing process of the imaging sensor when an acquisition optical axis is at a degree wider than 20° from the vertical axis, and acquiring the image data using vertical imaging, when the acquisition optical axis is at a degree smaller than 20° from the vertical axis.

According to a further aspect of the invention, the acquiring includes illuminating the crops during the acquiring, for compensating for the motion of the airborne imaging sensor with respect to the crops during the acquiring.

According to a further aspect of the invention, the flying includes the flying includes flying the airborne imaging sensor along a flight path which extends over at least a first agricultural property of a first owner and a second agricultural property of a second owner other than the first owner, wherein the method includes acquiring first image data of parts of first agricultural property and acquiring second image data of parts of the second agricultural property; generating first image data content based on the first image data and generating second image data content based on the second image data; for providing the first image data content to a first entity in a first message, and for providing the second data content to a second entity in a second message.

According to a further aspect of the invention, the acquiring includes acquiring image data of parts of the agricultural area which are inaccessible to land vehicles.

According to a further aspect of the invention, the acquiring includes acquiring image data of parts of the agricultural area which are inaccessible by foot.

According to a further aspect of the invention, the flying includes flying the imaging sensor by an agricultural aircraft which is configured for aerial application of crop protection products.

According to a further aspect of the invention, the method further includes selecting aerial application parameters for aerial application of crop protection products by the agricultural aircraft based on processing of the image data.

According to a further aspect of the invention, the set of imaging locations along the flight path are located less than 20 meters above the top of the crops growing in the agricultural area.

According to a further aspect of the invention, the acquiring includes acquiring image data of the agricultural area at a coverage rate of under 500 square meters per hectare.

According to a further aspect of the invention, the transmitting is followed by subsequent instance of the flying, the acquiring and the transmitting, wherein the method further includes planning a path for the subsequent instance of flying, based on the image data acquired in a previous instance of acquiring.

According to a further aspect of the invention, the acquiring includes compensating for movement of the imaging sensor during the acquisition of the image data.

According to a further aspect of the invention, the acquiring of the image data includes acquiring the image data using vertical imaging.

According to a further aspect of the invention, the method further includes applying computerized processing algorithms to the image data content for detecting leaves diseases or indication of parasites effect on the leaves, in one or more plants in the agricultural area.

According to a further aspect of the invention, the flying, the acquiring and the transmitting are reiterated over multiple weeks, wherein the method further includes processing image data acquired at different times over the multiple weeks, for determining growth parameters for the plants in the agricultural area.

According to a further aspect of the invention, the method further includes applying computerized processing algorithms to the image data for identifying selected agronomic significant data, and generating agronomic image data for transmission to a remote system based on the selected agronomic significant data.

According to a further aspect of the invention, the method further includes applying computerized processing algorithms to the selected agronomic significant data for selecting, out of a plurality of possible recipients, a recipient for the agronomic image data, based on agronomic expertise of the possible recipients.

According to a further aspect of the invention, the flying is preceded by defining a surveillance flight plan for an airborne surveillance system, the surveillance flight plan including acquisition locations plan indicative of a plurality of imaging locations, wherein the flying of the airborne sensor is part of flying the airborne surveillance system along a flight path over an agricultural area, based on the surveillance flight plan.

According to a further aspect of the invention, the flight path is a terrain following flight path; wherein the flying includes flying the imaging sensor by an agricultural aircraft which is configured for aerial application of crop protection products; wherein the set of imaging locations along the flight path are located less than 20 meters above the top of the crops growing in the agricultural area; wherein the acquiring includes: (a) acquiring image data at the set of imaging locations while flying the airborne imaging sensor along the imaging locations at velocities which do not fall below 50% of the average speed of the airborne platform along the flight path; and (b) compensating for the motion of the airborne imaging sensor with respect to the crops during the acquiring, by illuminating the crops during the acquiring and by mechanically moving at least one component of the airborne imaging sensor with respect to a carrying airborne platform; wherein the transmitting includes transmitting the image data content to the external system for displaying to an agronomist at a remote location agronomic image data which is based on the image data content, thereby enabling the agronomist to remotely analyze the agricultural area; wherein the method further includes: prior to the flying, defining a surveillance flight plan for an airborne surveillance system, the surveillance flight plan including acquisition locations plan indicative of a plurality of imaging locations, wherein the flying of the airborne sensor is part of flying the airborne surveillance system along a flight path over an agricultural area, based on the surveillance flight plan.

According to an aspect of the invention, there is disclosed a method for agricultural monitoring, the method including: (a) defining a surveillance flight plan for an airborne surveillance system, the surveillance flight plan including acquisition locations plan indicative of a plurality of imaging locations; (b) based on the surveillance flight plan, flying the airborne surveillance system along a flight path over an agricultural area in which crops grow; (c) based on the acquisition locations plan, acquiring during the flight by the airborne surveillance system image data of parts of the agricultural area at submillimetric image resolution; and (d) transmitting to an external system image data content which is based on the image data acquired by the airborne surveillance system.

According to a further aspect of the invention, the defining of the surveillance flight plan is preceded by receiving surveillance requests associated with a plurality of independent entities, and includes defining the surveillance flight plan to indicate imaging locations for crops of each of the plurality of independent entities.

According to a further aspect of the invention, the agricultural area includes a plurality of fields in which at least two types of crops grow, wherein the defining of the surveillance flight plan includes defining different acquisition parameters for imaging locations associated with different types of crops.

According to an aspect of the invention, there is disclosed an agricultural monitoring system, the agricultural monitoring system including: (a) an imaging sensor, configured and operable to acquire image data at submillimetric image resolution of parts of an agricultural area in which crops grow, when the imaging sensor is airborne; (b) a communication module, configured and operable to transmit to an external system image data content which is based on the image data acquired by the airborne imaging sensor; and (c) a connector operable to connect the imaging sensor and the communication module to an airborne platform.

According to a further aspect of the invention, the agricultural monitoring system further includes an airborne areal platform which is operable to fly the airborne imaging sensor along a flight path over an agricultural area.

According to a further aspect of the invention, the agricultural monitoring system further includes a detachable coupling, operable to detachably couple the airborne imaging sensor to an airborne platform.

According to a further aspect of the invention, the imaging sensor is configured and operable to acquire the image data at altitude smaller than 20 meters above the top of the crops growing in the agricultural area.

According to a further aspect of the invention, the imaging sensor is configured and operable to acquire the image data while flown at velocities which exceed 10 m/s.

According to a further aspect of the invention, the agricultural monitoring system further includes at least one mechanical coupling which couples at least one component of the imaging sensor to an engine, by which motion of the engine mechanically moves the at least one component of the imaging sensor with respect to the airborne platform concurrently to the acquisition of image data by the imaging sensor.

According to a further aspect of the invention, the agricultural monitoring system further includes an engine operable to mechanically rotate at least one optical component of the imaging sensor with respect to the airborne platform, for compensating for the motion of the imaging sensor with respect to the crops during the acquiring; wherein the imaging sensor is configured and operable to: (a) initiate a focusing process concurrently to the rotation of the at least one optical component when an acquisition optical axis is at a degree wider than 20° from the vertical axis, and (b) acquire the image data using vertical imaging, when the acquisition optical axis is at a degree smaller than 20° from the vertical axis.

According to a further aspect of the invention, the agricultural monitoring system further includes an illumination unit, configured and operable to illuminate the crops during acquisition of image data by the imaging sensor.

According to a further aspect of the invention, the imaging sensor is configured and operable to acquire the image data using vertical imaging.

The agricultural monitoring system according to claim 23, further including a processor which is configured and operable to process the image data content for detecting leaves diseases or indication of parasites effect on the leaves in one or more plants in the agricultural area.

According to a further aspect of the invention, the agricultural monitoring system further includes a processor which is configured and operable to process the image data content for identifying selected agronomic significant data, and to generate agronomic image data for transmission to a remote system based on the selected agronomic significant data.

According to an aspect of the invention, there is disclosed a method for agricultural monitoring, the method including: (a) receiving image data content which is based on image data of an agricultural area, wherein the image data is a submillimetric image resolution image data acquired by an airborne imaging sensor at a set of imaging locations along a flight path extending over the agricultural area; (b) processing the image data content to generate agronomic data which includes agronomic image data; and (c) transmitting the agronomic data to an end-user remote system.

According to a further aspect of the invention, the processing includes analyzing the image data content for identifying selected agronomic significant data within the image data content; and processing the agronomic significant data to provide the agronomic data.

According to a further aspect of the invention, the processing includes applying computerized processing algorithms to the image data content for detecting leaves diseases or indication of parasites effect on the leaves in one or more plants in the agricultural area.

According to a further aspect of the invention, the receiving includes receiving image data content of the agricultural area acquired at different days, wherein the processing includes processing the image data content for determining growth parameters for the plants in the agricultural area.

According to a further aspect of the invention, the method further includes applying computerized processing algorithms to agronomic data for selecting, out of a plurality of possible recipients, a recipient for the agronomic image data, based on agronomic expertise of the possible recipients.

According to a further aspect of the invention, the image data content includes first image data content of a first agricultural property of a first owner, and second image data content of a second agricultural property of a second owner other than the first owner; wherein the transmitting includes transmitting the first image data content in a first message, and transmitting the second data content in a second message.

According to a further aspect of the invention, the image data content is based on image data acquired at a set of imaging locations along the flight path which are located less than 20 meters above the top of the crops growing in the agricultural area.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 5A through 5E illustrate optional stages of a method for agricultural monitoring, in accordance with examples of the presently disclosed subject matter;

FIG. 6 is a flow chart illustrating an example of a method for agricultural monitoring, in accordance with examples of the presently disclosed subject matter;

FIGS. 11A, 11B, 11C and 11D are functional block diagrams illustrating examples of an agricultural monitoring system with motion compensation mechanisms, in accordance with examples of the presently disclosed subject matter;

FIG. 13 illustrates several images acquired by an airborne imaging sensor, according to a method for agricultural monitoring, in accordance with examples of the presently disclosed subject matter;

FIG. 14 illustrates cropping of individual leaves from the image data, in accordance with examples of the presently disclosed subject matter;

FIG. 15 is a flow chart illustrating an example of a method for agricultural monitoring, in accordance with examples of the presently disclosed subject matter;

FIG. 16 is a functional block diagram illustrating an example of a server used for agricultural monitoring, in accordance with examples of the presently disclosed subject matter;

Figure 1A:
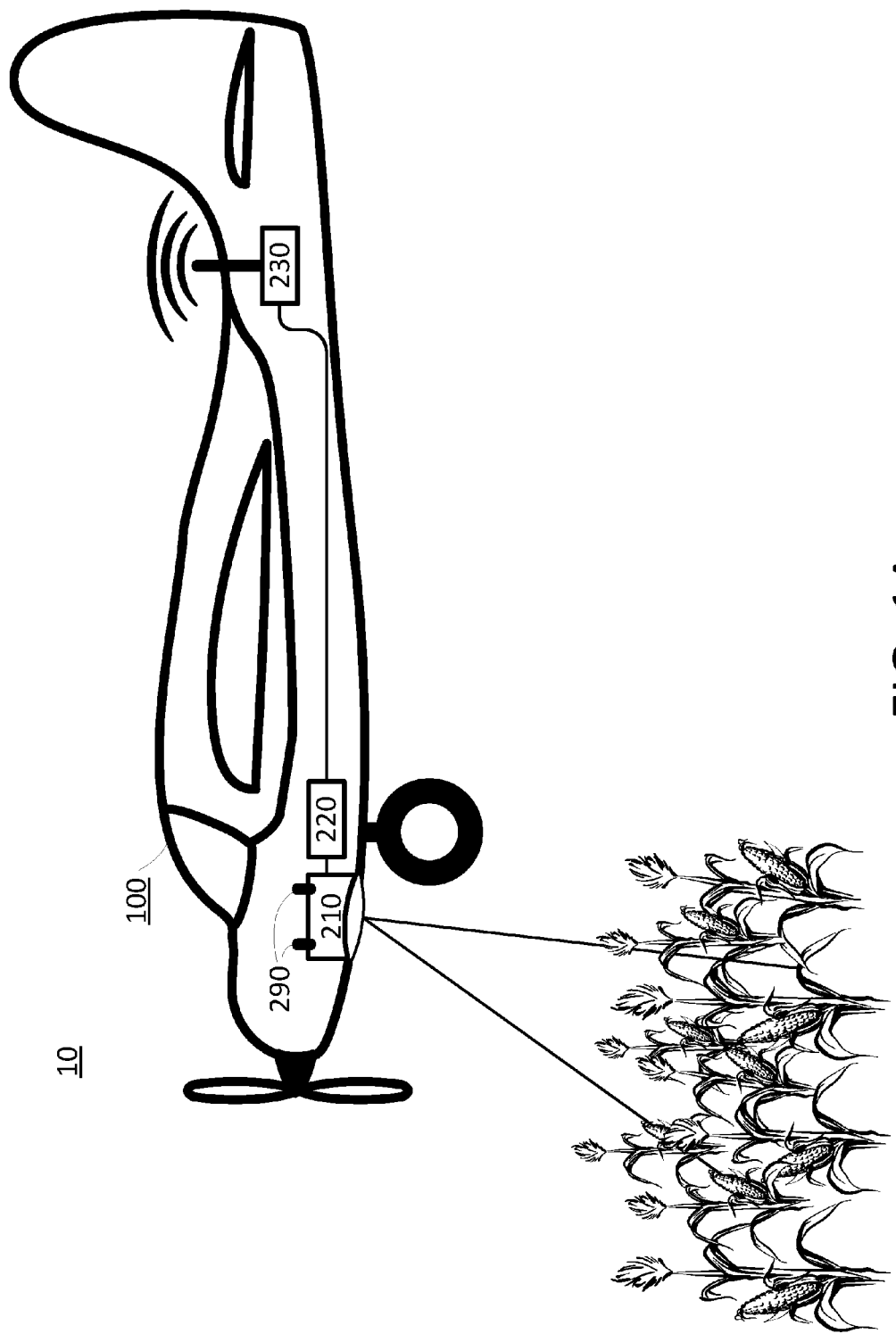
FIG. 1A is a functional block diagram illustrating an example of a system in an example environment, in accordance with examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "processing", "calculating", "computing", "determining", "generating", "setting", "configuring", "selecting", "defining", or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter.

Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

FIG. 1A is a functional block diagram illustrating an example of system 10 in an example environment, in accordance with examples of the presently disclosed subject matter. System 10 is an airborne system, which include an airborne platform 100, which carries imaging sensor 210. As discussed below in greater detail, imaging sensor 210 is flown by airborne platform 100 over an agricultural area, so as to enable imaging sensor 210 to acquire image data of the agricultural area. Image data content which is based on the acquired image data is then transferred from system 10 to a remote location, where it can be analyzed for obtaining agronomic significant data.

Different types of airborne platforms may be used as airborne platform 100. For examples, airborne platform 100 may be an airborne platform of any one of the following airborne platform types: an airplane, a helicopter, a multirotor helicopter (e.g. a quadcopter), an unmanned aerial vehicle (UAV), a powered parachute (also referred to as motorized parachute, PPC, and paraplane), and so on. The type of airborne platform 100 may be determined based on various considerations, such as aerodynamic parameters (e.g. velocity, flight altitude, maneuvering capabilities, stability, carrying capabilities, etc.), degree of manual control or automation, additional uses required from the airborne platform, and so on.

In addition to imaging sensor 210, system 10 further includes processor 220 and communication module 230, all of which are connected to airborne platform 100. The connection of any one of imaging sensor 210, processor 220 and communication module 230 (or any other component of system 10 carried by airborne platform 100) to airborne platform 100 may be a detachable connection, but this is not necessarily so. For example, any one of the aforementioned components 210, 220 and/or 230 may be designed to be easily installed on and removed from an airborne platform 100 which may be used for various utilizations when the relevant components of system 10 are not installed on it.

Figure 1B:
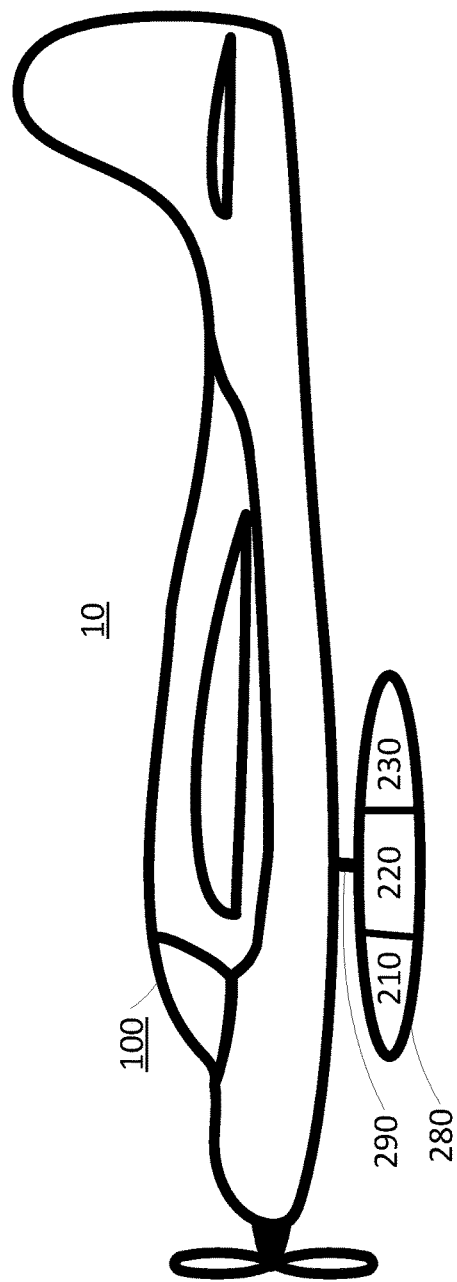
FIG. 1B is a functional block diagram illustrating an example of a system in an example environment, in accordance with examples of the presently disclosed subject matter.

FIG. 1B is a functional block diagram illustrating an example of system 10 in an example environment, in accordance with examples of the presently disclosed subject matter. As can be seen in the example of FIG. 1B, some of the components of system 10 (and especially imaging sensor 210) may be included in a stand-alone detachable pod 280 which may be attached and detached from one or more aircraft, based on need. Such a stand-alone pod 280 may consist of agricultural monitoring system 200, which is discussed below, e.g. with respect to FIGS. 9-11C.

Figure 1C:
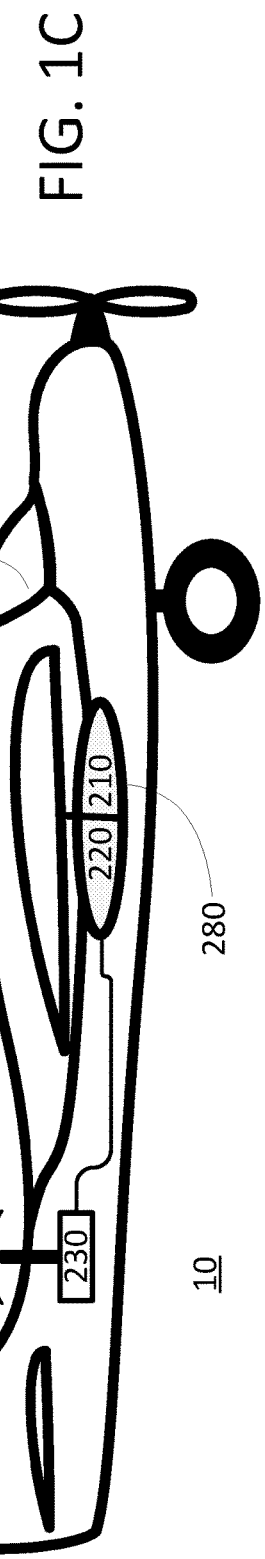
FIG. 1C is a functional block diagram illustrating an example of a system in an example environment, in accordance with examples of the presently disclosed subject matter.

FIG. 1C is a functional block diagram illustrating an example of system 10 in an example environment, in accordance with examples of the presently disclosed subject matter. In the example of FIG. 1C, some of the components which enable the agricultural utilization of system 10 are located in an external pod 280, while others functionalities are enabled by components of airborne platform 100 (in the illustrated example, communication module 230).

As exemplified in FIGS. 1B and 1C, the detachable pod 280 may be detachable pod with respect to airborne platform 100. For example, detachable pod 280 may be detachably attached to a fuselage of airborne platform 100 (e.g. to its underbelly, as exemplified in FIG. 1B), or to a wing of airborne platform 100 (as exemplified in FIG. 1C).

It is noted that system 10 may include additional components, such as an altimeter, an airspeed indicator, pitch, roll and/or yaw sensors, an interface for connecting to avionics and other systems of airborne platform 100, etc.

Figure 2:
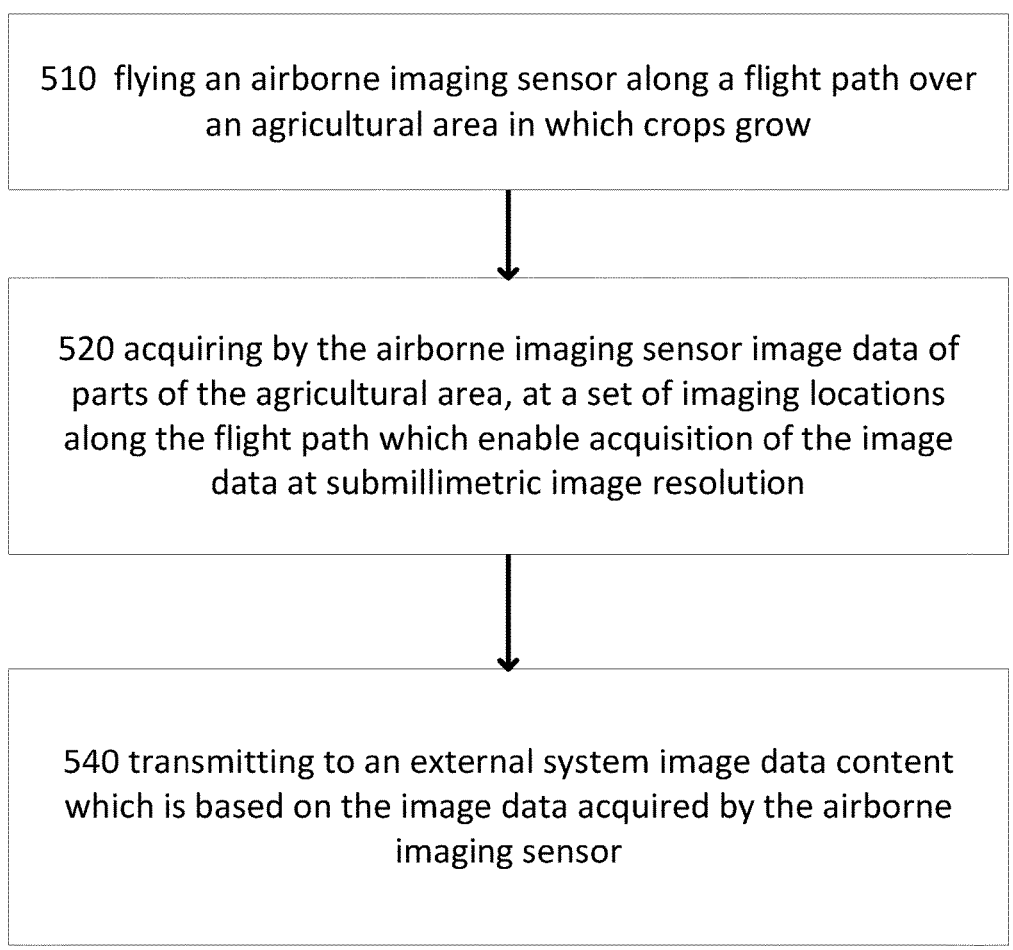
FIG. 2 is a flow chart illustrating an example of a method for agricultural monitoring, in accordance with examples of the presently disclosed subject matter.

FIG. 2 is a flow chart illustrating an example of method 500 for agricultural monitoring, in accordance with examples of the presently disclosed subject matter. Referring to the examples set forth with respect to the previous drawing, method 500 may be executed by system 10. Additional discussion and details pertaining to system 10 are provided below, following the discussion pertaining to method 500.

Stage 510 of method 500 includes flying an airborne imaging sensor along a flight path over an agricultural area in which crops grow. Referring to the examples set forth with respect to the previous drawings, the airborne imaging sensor may be imaging sensor 210, and the flying of stage 510 may be executed by airborne platform 100.

It is noted that crops of different types may grow in the aforementioned agricultural area, and that the crops may include crops of one or more plant types. For example, the agricultural area may be arable land (land under annual crops, such as cereals, cotton, potatoes, vegetables, etc.), land used to grow permanent crops (e.g. orchards, vineyards, fruit plantations, etc.). It is noted that the agricultural area may also be a marine (or otherwise water-based) agricultural area, e.g. a water surface used for farming of species of algae (Algaculture). Furthermore, while method 500 may be used for agricultural monitoring of cultivated land, it is noted that it may also be used for agricultural monitoring of non-cultivated land (e.g. natural forests, pastures, and meadows, etc.). In such cases, the plants which grow in such areas may monitored as the crops of these areas. The agricultural area which is being agriculturally monitored in method 500 may include one or more types of agricultural areas (e.g. any one or more of the above example, e.g. including both an orchard and a potatoes field).

Stage 520 of method 500 includes acquiring by the airborne imaging sensor image data of parts of the agricultural area, wherein the acquiring of the image data includes acquiring by the airborne imaging sensor at least part of the image data at a set of imaging locations along the flight path which enable acquisition of the image data at submillimetric image resolution. Referring to the examples set forth with respect to the previous drawings, the acquiring of stage 520 may be carried out by imaging sensor 210.

The image data acquired in stage 520 may include one or more independent images, one or more video sequences, a combination thereof, and may also include any other type of image data known in the art. The acquiring of image data in stage 520 may include acquiring visible light or other electromagnetic radiation (e.g. ultraviolet light (UV), infra-red light (IR), or other parts of the electromagnetic spectrum). Other image acquisition technologies may also be used, in addition or instead of acquisition of light. For example, stage 520 may include acquiring image data by a synthetic-aperture radar (SAR) sensor.

The acquiring of the image data in stage 520 include acquiring at least part of the image data in submillimetric resolution. That is, in at least part of the image data acquired by the airborne imaging sensor, parts of the agricultural area are imaged in a detail level which enable resolving details of these parts of the agricultural area which are finer (i.e. smaller) than one square millimeter ($mm^2$). It is noted that the resolvable details of the image data may be significantly smaller than one square millimeter, e.g. smaller than 0.01 square millimeter.

It is noted that stage 520 may include acquiring by the airborne imaging sensor image data of parts of the agricultural area at an image resolution which is finer by at least one order of magnitude than an average leaf size of the imaged crop. That is, in at least part of the image data, a plurality of leaves of the crop are imaged in a resolution which enables resolving at least ten independently resolvable parts of the leaf. A different intensity may be measured for each one of these resolvable parts of the leaf. Optionally, stage 520 may include acquiring by the airborne imaging sensor image data of parts of the agricultural area at an image resolution which is finer by at least two orders of magnitude than an average leaf size of the imaged crop. Optionally, stage 520 may include acquiring by the airborne imaging sensor image data of parts of the agricultural area at an image resolution which is finer by at least three or more orders of magnitude than an average leaf size of the imaged crop.

Image data in which a single leaf of the crop is imaged with a plurality of individually resolvable areas (e.g. more than 100 individually resolvable areas) enable using the image data to detect leaf condition of the crop, e.g. identifying different leaves diseases, identifying insects and parasites on the leaves, identifying indications of parasites effect on the leaves (e.g. eaten parts), and so on.

It is noted that stage 520 may include acquiring image data of parts of the agricultural area in more than one resolution and/or in more than one image acquisition technology. In such cases, different images (or videos) of the same part of the agricultural area which are taken in different resolution and/or technology may be taken concurrently or in different times (e.g. in different parts of the flight path, possibly flying in another direction, altitude, etc.). Images in different resolutions and/or in different parts of the electromagnetic spectrum may be acquired by a single sensor (e.g. taken at different times, using different lenses, using different optical filters, using different electronic filters, and so on).

Stage 540 of method 500 includes transmitting to an external system image data content which is based on the image data acquired by the airborne imaging sensor. Referring to the examples set forth with respect to the previous drawings, the transmitting of stage 540 may be executed by communication module 230. The image data content which is transmitted in stage 540 may include some or all of the image data acquired in stage 520. Alternatively (or in addition), the image data which is transmitted in stage 540 may include image data content which is created by on a processing of the image data acquired in stage 520.

The transmitting of stage 540 may include transmitting the image data content in a wireless manner, while the airborne platform which carries the airborne platform is still in air. However this is not necessarily so, and some (or all) of the image data content transmitted in stage 540 may be transmitted after this aircraft have landed. The transmitting of the image data content may include transmitting the image data content in a wireless manner (e.g. using radio communication, satellite based communication, cellular network, etc.), in a wired manner (especially if transmitting the data after landing of the aircraft, e.g. using universal serial bus (USB) communication), or in any combination thereof. The transmitting of the image data content in stage 540 may be executed in real-time or near real time (transferring image data corresponding to one part of the imaged agricultural area before acquiring image data corresponding to another part of the imaged agricultural area), but this is not necessarily so.

As will be discussed below in greater detail, the image data content may be transmitted to different types of entities, and for different utilizations by such entities. For example, the image data content may be transmitted to an off-site system, to be reviewed by an expert and/or to be processed by a computerized system in order to determine agronomic significant data for the agricultural area and/or for the crops inside it. In another example, the image data content may be transferred to an aerial application system (e.g. an agricultural aircraft or a ground control system), for determining aerial application parameters for aerial application of pesticides (crop dusting) and/or fertilizer (aerial topdressing). It is noted that aerial application may refer to applying to various kinds of materials from an aircraft—fertilizers, pesticides, seeds, etc. such aircrafts may be airplanes or helicopters—but other types of aircrafts may also be used (e.g. hot air balloons). It is noted that in the context of the present disclosure, agricultural aircraft (and especially aerial application aircraft) may be a manned aircraft but also an unmanned aircraft.

Figure 3:
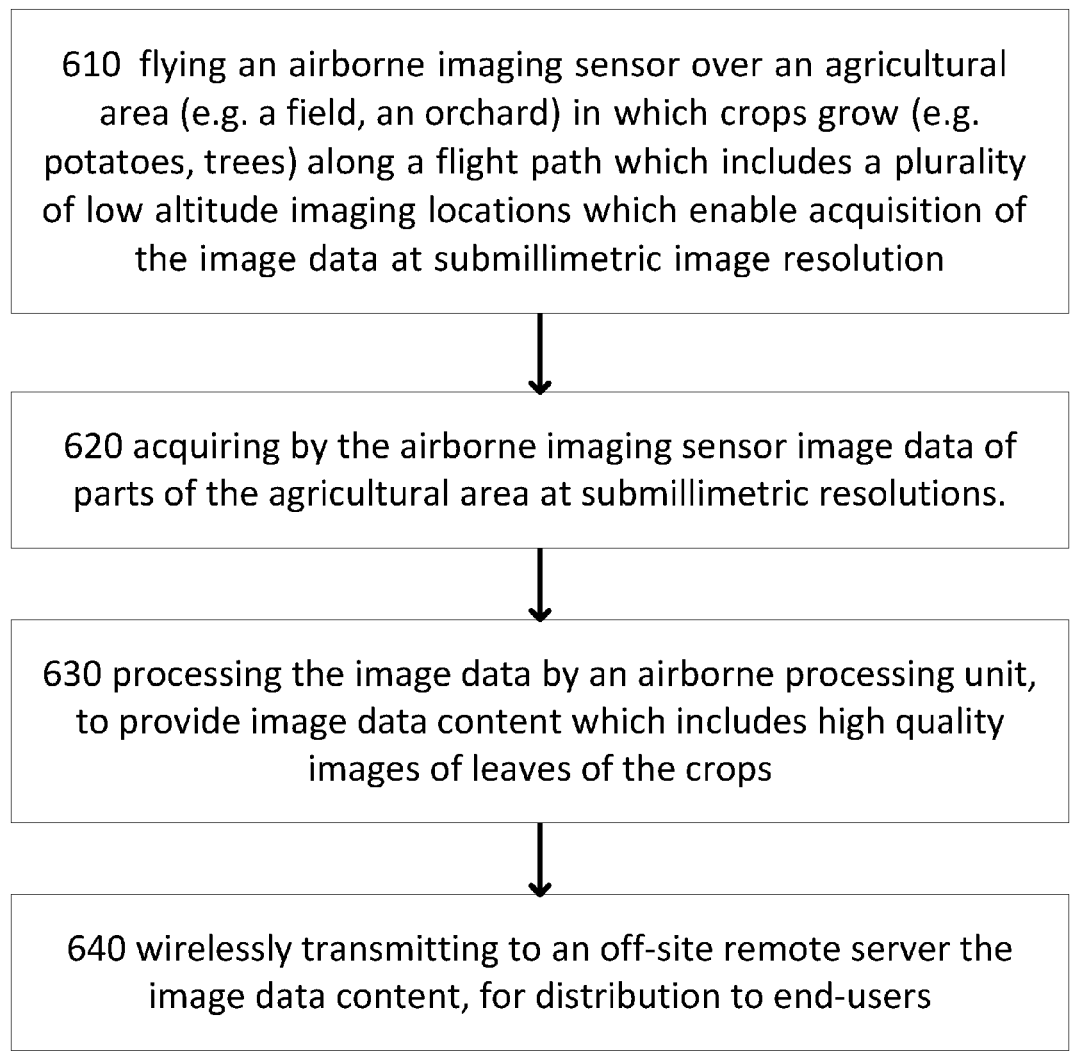
FIG. 3 is a flow chart illustrating an example of a method for agricultural monitoring, in accordance with examples of the presently disclosed subject matter.

FIG. 3 is a flow chart illustrating an example of method 600 for agricultural monitoring, in accordance with examples of the presently disclosed subject matter. Referring to the examples set forth with respect to the previous drawing, method 600 may be executed by system 10. Method 600 is an example of method 500, and the stages of method 600 are numbered in corresponding reference numerals to these of method 500 (i.e. stage 610 is an example of stage 510, stage 620 is an example of stage 520, and so on). It is noted that variations and examples discussed with reference to method 500 (either above or below in the disclosure) are also relevant for method 600, where applicable.

Method 500, as implemented in the example of method 600, includes using an airborne imaging sensor carried by an aircraft flying at very low altitudes for acquiring extremely high-resolution images of agricultural crops at high-rate (sampling large areas of the agricultural area in relatively little time). The image data content generated on the airborne system is transmitted for processing at a remote off-site analysis server. The image data content is than processed by the analysis server, and afterwards it is distributed to a management interface (e.g. a personal computer, a handheld computer and so on), where it is provided to an agronomist, to a manager to another professional or to a dedicated system for further analysis. The high resolution of the images acquired in stage 620 enable analysis of individual leaf level, which may be used, for example, in order to detect leaf diseases and/or indication of parasites effect on the leaves, etc.

As discussed below in greater detail, not all of the agricultural area is necessarily imaged, and a representing sample thereof may be selected. It is noted that agronomists which inspect an agricultural area (e.g. a field, an orchard) for leaf diseases generally sample the agricultural area by foot, sampling leaves along a sampling path designed to represent parts of the agricultural area. Using an airborne imaging sensor which provides submillimetric resolution images of leaves across the agricultural area at high rates is not only faster than afoot sampling of the agricultural area but also enable imaging of parts of the agricultural area which are inaccessible to pedestrian. For example leaves at treetops may be imaged, as well as plants which are located within dense vegetation or over rough terrain.

Stage 610 of method 600 includes flying an airborne imaging sensor over an agricultural area in which crops grow along a flight path which includes a plurality of low altitude imaging locations which enable acquisition of the image data at submillimetric image resolution. The flight path may include continuous low altitude flight legs (a flight leg being a segment of a flight plan between two waypoints). Referring to the examples set forth with respect to the previous drawings, the airborne imaging sensor may be imaging sensor 210, and the flying of stage 610 may be executed by airborne platform 100.

Optionally, stage 610 may include flying the airborne imaging sensor along a terrain following flight path (also referred to as "nap of the earth"). The altitude of such terrain following flight path above the terrain (measured either above the face of the earth, or above the vegetation, according to circumstances) may differ, based on different considerations (such as aerodynamic concerns, optical requirements of the imaging sensor, dimensions of the crops, etc.). For example, stage 610 may include flying the airborne imaging sensor above the agricultural area at altitudes lower than 30 meters (30 m) above the ground. For example, stage 610 may include flying the airborne imaging sensor above the agricultural area at altitudes lower than 20 m above the ground. For example, stage 610 may include flying the airborne imaging sensor above the agricultural area at altitudes lower than 10 m above the ground. It is noted that the height of the terrain following flight path may also be measured above the top of the crops growing in the agricultural area (e.g. less than 10 m, 20 m, or 30 m above the top of such crops).

Figure 4A:
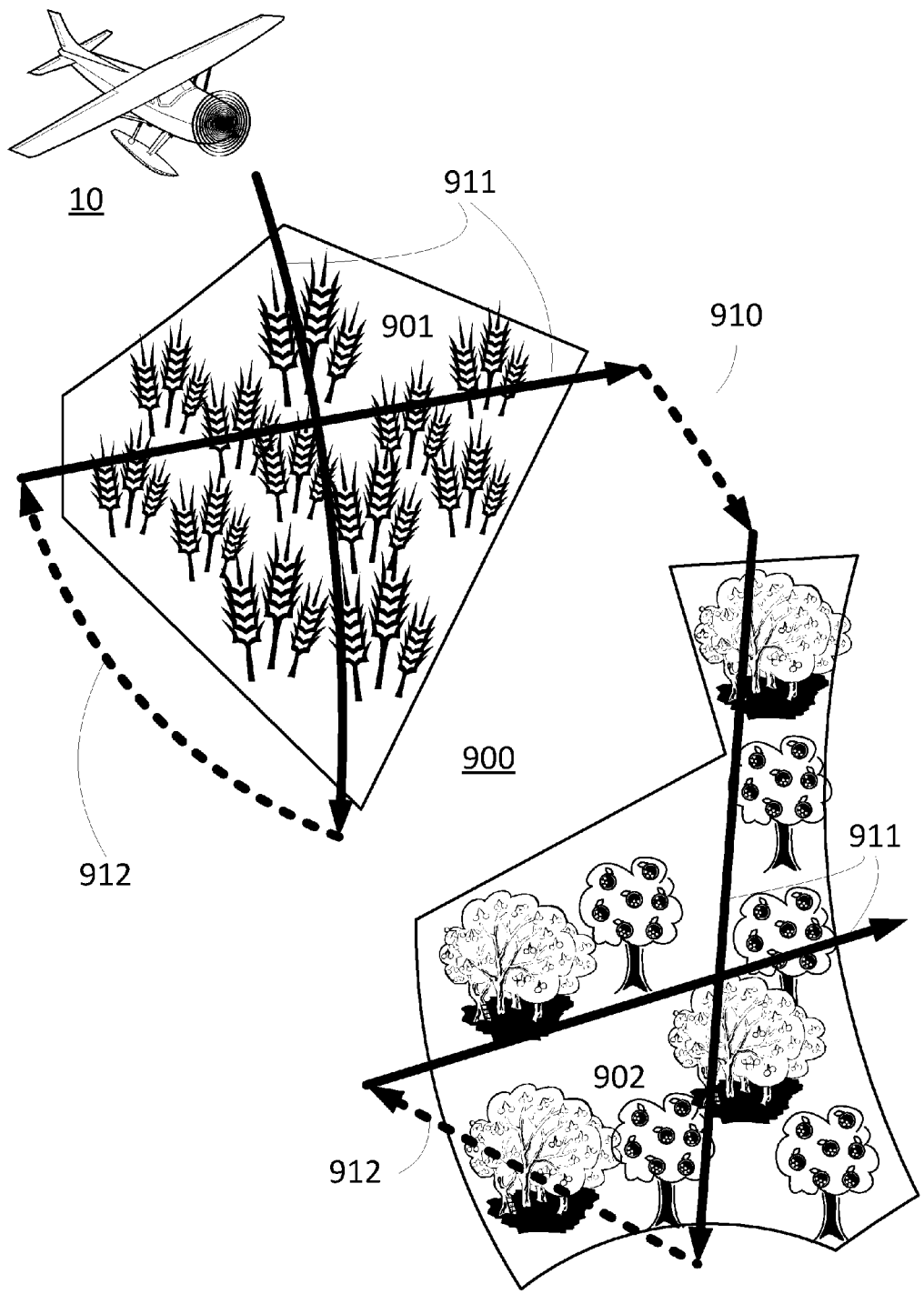
FIG. 4A illustrates a system, an agricultural area, and a flight path, in accordance with examples of the presently disclosed subject matter.

FIG. 4A illustrates system 10, agricultural area 900, and flight path 910, in accordance with examples of the presently disclosed subject matter. In the illustrated example, agricultural area 900 includes two separated areas—wheat field 901 and orchard 902.

Flight path 910 also include two main type of flight legs—imaging flight legs 911 along which the airborne imaging sensor acquires image data of the agricultural area, and transition flight legs 912, in which the airborne platform flies from an end of one imaging flight leg 911 and/or to a beginning of another imaging flight leg 912. Imaging flight legs 911 are illustrated with continuous arrows, while transition flight legs are illustrated using dashed arrows. Transition flight legs 912 may be planned over areas which are of no interest for agronomic needs, but possibly also above agricultural area of interest, e.g. if sufficient data is already sampled for this area.

It is noted that the two parts of agricultural area 900 (i.e. areas 901 and 902) may belong to different entities. For example, wheat field 901 may belong to farmer MacGregor, while orchard 902 may be a research orchard of an agricultural company. Thus, in a simple flight, method 500 (and thus also method 600) may include collecting image data of agricultural properties of independent entities.

Clearly, field 901 and orchard 902 differ from each other in both agricultural and agronomical aspect. The imaging of these two different areas may therefore require different operational parameters—of the airborne platform (e.g. velocity, altitude above ground level, stability, etc.) and/or of the airborne imaging sensor (e.g. exposure time, f-number, lens focal length, resolution, detector sensitivity, speed compensation, etc.). It is noted that the acquisition of image data in stage 520 (and thus also in stage 620) may include acquiring image data of different parts of the agricultural area using different acquisition modes (differing from each other in aerodynamic and/or sensor parameters, e.g. as discussed above).

Reverting to FIG. 3, Stage 620 of method 600 includes acquiring by the airborne imaging sensor image data of parts of the agricultural area at submillimetric resolutions. It is noted that parts of the agricultural area may also be imaged in lower resolutions (e.g. for generating orientation images, to which the submillimetric image data may be associated). Nevertheless, the majority of the agricultural area section which is imaged in stage 620 is preferably imaged as submillimetric resolution. As mentioned above with respect to method 500, optionally this imaged agricultural area section may be a sample of the agricultural area for which agronomic analysis is obtained in method 600. The same parts which are imaged in the submillimetric resolution may also be imaged in lower resolution, as discussed above. Referring to the examples set forth with respect to the previous drawings, the acquiring of stage 620 may be carried out by imaging sensor 210.

The imaging of the agricultural area in stage 620 include acquiring imaging data of representative parts of the agricultural area (e.g. sampled at different sampling locations across the agricultural area) at an image resolution which is sufficient to analyze individual leaves of the imaged crops (e.g. finer by at least one or two orders of magnitude than an average leaf size of the imaged crop). FIG. 13 illustrates several images 1000 acquired by an airborne imaging sensor, according to method 600, in accordance with examples of the presently disclosed subject matter. As can be seen in the different illustrations, leaves of different kinds of plants may be analyzed for different types of leaves conditions (e.g. dryness, pests, diseases, etc.).

Reverting to FIG. 3, it is noted that the image resolution of the image data acquired by the airborne imaging sensor depends on several factors—some of which depend on the imaging sensor itself (e.g. lens, pixel density of the detector, etc.), and some of which depend on the airborne platform (e.g. altitude above ground, velocity, stability, etc.).

A ground sample distance (GSD) may be defined for the acquired image data as the distance between pixel centers measured on the ground. For example, in an image data (corresponding to a single image or to video data) with a 500 nanometer GSD, adjacent pixels image locations are 500 nanometers apart on the ground. It is noted that the GSD of the image is not equal to its resolution, as resolving data of adjacent pixels poses additional requirements (e.g. optical resolving quality of the lens used for imaging). GSD is also referred to as ground-projected sample interval (GSI) or ground-projected instantaneous field of view (GIFOV).

As a general consideration, given a specific imaging sensor, the GSD is about inversely proportional to the distance between the imaging sensor and the imaged subject. Nap of the earth flight in stage 510 may facilitate acquisition of the image data at submillimetric resolution. Optionally, the GSD of the image data acquired in stage 620 is lower than 0.75 mm (i.e. each pixel covers ground area smaller than 0.75×0.75 mm$^2$). Optionally, the GSD of the image data acquired in stage 620 is lower than 0.5 mm (i.e. each pixel covers ground area smaller than 0.5×0.5 mm$^2$).

Stage 630 of method 600 includes processing the image data by an airborne processing unit, to provide image data content which includes high quality images of leaves of the crops. The airborne processing unit is carried by the same airborne platform which flies the airborne imaging sensor over the agricultural area. Referring to the examples set forth with respect to the previous drawings, stage 630 may be carried out by processor 220.

The processing of stage 630 may include filtering the image data (e.g. to discard image data which is not quality enough, or selecting a representative image for each area), compressing the image data, improving the image data (e.g. applying image enhancement processing algorithms to which), selecting agronomic significant data, or any combination of the above, as well as other possible processing techniques which are known in the art.

For example, the processing of stage 630 may include processing the acquired image data in order to filter out acquired images which are not quality enough, analyzing the remaining images to identify leaves of the crops of the agricultural area (e.g. based on leaf identification parameters preloaded to the processing module) in some of the acquired images, selecting out of the images which include identifiable leaves in high quality a representing sample, and compressing the selected images to provide the image data content to be transmitted to an external system.

Stage 640 of method 600 includes wirelessly transmitting to an off-site remote server the image data content, for distribution to end-users. Referring to the examples set forth with respect to the previous drawings, the transmitting of stage 640 may be executed by communication module 230. The wireless transmitting of the image data content in stage 640 may be executed in different ways (e.g. using radio communication, satellite based communication, cellular network, etc.).

From the server, the image data content—or agronomic significant data which is based on the image data content—may be distributed to various entities, such as farmers, agronomists, aircraft pilots, airborne systems, etc.

Figure 4B:
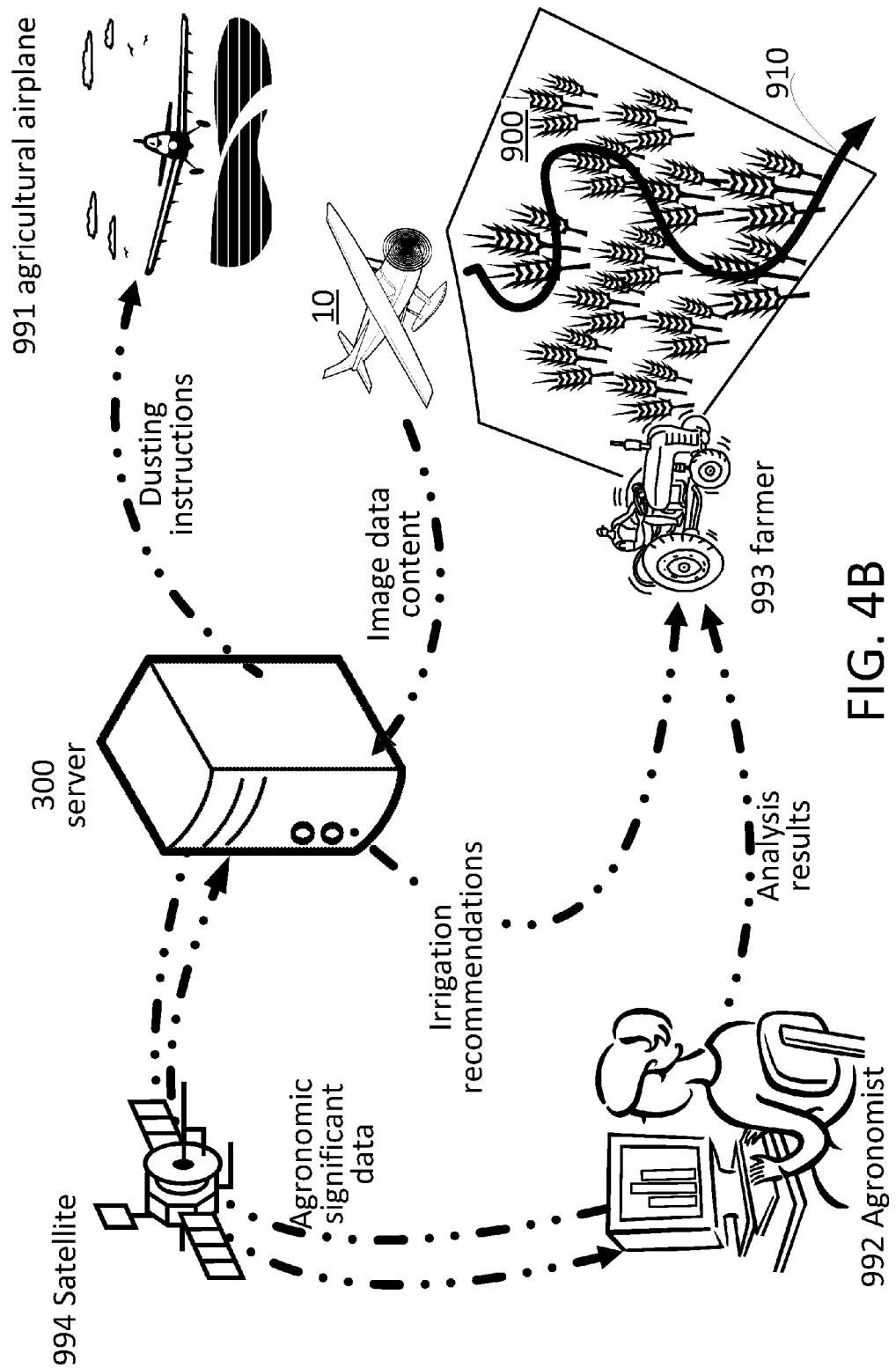
FIG. 4B illustrates a system, an agricultural area, a flight path, a server, and a plurality of example entities to which agronomic significant data which is based on the image data acquired by the system may be transmitted, in accordance with examples of the presently disclosed subject matter.

FIG. 4B illustrates system 10, agricultural area 900, flight path 910, server 300, and a plurality of example entities to which agronomic significant data which is based on the image data acquired by system 10 may be transmitted, in accordance with examples of the presently disclosed subject matter.

Optionally, various computerized processing algorithms may be applied by the server to the image data for identifying selected agronomic significant data, and generating agronomic image data for transmission to a remote system based on the selected agronomic significant data.

For example, the image data content (whether processed or not) may be provided to an agronomist 992 (in the illustrated example this is done via a satellite connection 994). The agronomist 992 (e.g. an agronomist specializing in *quinoa* residing in another country) may analyze the provided data, and in return recommend which following step should be carried out. Such information may be provided to a farmer 993 or owner of the agricultural area, or directly to another entity (e.g. aerial application instruction for spraying crops with crops protection products, provided directly to an agricultural aircraft 991 which can apply such products to the agricultural area).

It is noted that system airborne platform 100 of system 10 may be used as an agricultural aircraft used for aerial dusting. The acquisition of the image data by the airborne imaging sensor in such a case may be executed while in aerial application flight (either concurrently with the aerial application, or in other times of the flight). This way, a dedicated airborne imaging sensor may be installed on an agricultural aircraft which is intended to fly over the agricultural area, and the flight may thereby be used for the additional benefit of gathering image data of agronomic interest.

Such direction or recommendations do not necessarily require involvement of an agronomist, and optionally other entities (e.g. farmer 993 or server 300 itself) may analyze information which is based on the image data acquired by system 10, to provide recommendations, instructions, analysis, or other information which may be used to improve a condition of the agricultural area and/or of the crops growing in it.

Furthermore, information gathered with respect to the agricultural area imaged by system 10 may be used to determine how to improve a condition of areas other than the imaged agricultural area. For example, if the imaged data enabled identifying aphids in the agricultural area, nearby fields may also be sprayed based on this information.

FIGS. 5A through 5E illustrate optional stages of method 500 for agricultural monitoring, in accordance with examples of the presently disclosed subject matter. FIGS. 5A through 5E illustrate additional stages and variations on previously presented stages which may be implemented as part of method 500. It is noted that not all of this stages and variations are necessarily implemented together in a single implementation of the invention. All combinations of stages of variations which are discussed with respect to method 500 may be implemented, and consist part of this disclosure.

Referring to stage 510, optionally the flight path is a terrain following flight path. In other words, stage 510 may include optional stage 511 of flying the airborne imaging sensor along a terrain following flight path. The altitude of the terrain following path above the terrain may be lower than a predetermined height during imaging flight legs, e.g. lower than 20 m above ground (or above crops height where applicable, e.g. above dense forest).

It is noted that stage 510 may include flying the airborne platform at altitudes which reduces effects of optical aberrations of the imaging sensor and of vibrations of the imaging sensor and/or of the carrying airborne platform on the imaged data so as to enable acquisition of the imaging data in submillimetric resolution.

As discussed in greater below with respect to stage 520, optionally the image data is acquired by the airborne imaging sensor while the airborne platform is in motion, possibly without requiring the airborne platform to slow down. This way, system 10 as a whole can image larger parts of the agricultural area at a given time. This, stage 510 may include stage 512 of flying in velocities which exceed 10 m/s across each imaging location out of the aforementioned set of imaging locations (at which the acquiring of the image data at submillimetric image resolution is executed).

Assuming an average speed of the airborne platform along an imaging flight leg which include a plurality of the aforementioned imaging locations, the flying of stage 510 may include stage 513 of flying the airborne imaging sensor along the imaging locations of that imaging flight leg at velocities which do not fall below 50% of the average speed along that imaging flight leg.

Stage 510 may include stage 514 of flying the airborne imaging sensor by an agricultural aircraft which is configured for aerial application of crop protection products. It is noted that the acquiring of stage 520 in such case may be executed in parallel to the aerial application (usually executed in very low altitudes above the crops, e.g. at altitudes of 3-5 meters above crops, and possibly even lower), or at other parts of the flight (e.g. when the agricultural aircraft is in transition between two fields). As discussed below in greater detail, the application itself may be based on processing of image data acquired in method 500, either a real-time processing of image data acquired by the same airborne system, or by processing image data acquired in previous flights.

Referring to the examples set forth with respect to the previous drawings, each stage out of stage 511, 512, 513 and 514 may be executed by airborne platform 100.

As was mentioned above, the agricultural area may include different areas which are associated with different entities. It is therefore noted that stage 510 may include flying the airborne imaging sensor along a flight path which extends over at least a first agricultural property of a first owner and a second agricultural property of a second owner other than the first owner. In such a case, the acquiring in stage 520 may include acquiring first image data of parts of first agricultural property and acquiring second image data of parts of the second agricultural property, and the method may further include generating first image data content based on the first image data and generating second image data content based on the second image data. This enable to provide the first image data content to a first entity in a first message, and providing the second data content to a second entity in a second message. Each of the first message and the second message may include information identifying the owner of the respective agricultural property, and/or may be addressed to a system and/or another entity associated with the respective owner. It is noted that the distinction between first image data content and the second image data content is not necessarily executed onboard system 200, and may also be executed by server 300.

Referring now to stage 520 which includes acquiring by the airborne imaging sensor image data of parts of the agricultural area, wherein the acquiring of the image data includes acquiring by the airborne imaging sensor at least part of the image data at a set of imaging locations along the flight path which enable acquisition of the image data at submillimetric image resolution.

As mentioned above, the image data may be acquired when the airborne platform is progressing along the flight path at a regular pace, without slowing down its flight. Optionally, stage 520 may include stage 521 of acquiring image data (some of it or all of it) at the set of imaging locations while flying the airborne imaging sensor along the imaging locations at velocities which do not fall below 50% of the average speed of the airborne platform along the flight path.

It is noted that slowing down may not be required at all, and the acquiring of stage 520 may be executed without reducing a flight speed in which the airborne imaging sensor is flown along the flight path. Optionally, the acquiring of stage 520 may include compensating for movement of the imaging sensor during the acquisition of the image data. This may be achieved, for example, by using one or more techniques of motion compensation.

Such various techniques for motion compensation may be used, for example, in order to avoid blur in the image which results from acquiring images while the airborne platform which carries the airborne imaging sensor is flying forward.

One such technique which may be used as part of method 500 for motion compensation is moving the airborne imaging sensor (or part of which) during the process of acquisition of image data. The moving of the airborne imaging sensor (or of the one or more relevant parts of which) may be executed when the image data is actually gathered (e.g. when a detector of the airborne imaging sensor, such as a charge-coupled device, CCD, is collecting light arriving from the agricultural area), but may also be executed in other parts of the process of image data acquisition (e.g. during a focusing process which precedes the light collection).

This kind of motion compensation may be achieved by moving one or more parts of the airborne imaging sensor without rotating the optical axis of the light collecting parts of the sensor, (e.g. moving the sensor in a the opposite direction to the direction of flight) and/or by moving or rotating parts of the airborne imaging sensor so as to rotate its light collection optical axis (e.g. by rotating a mirror or a prism which directs light arriving from an imaged location of the agricultural area onto a light recording part of the sensor, such as a CCD).

Stage 520 may therefore include stage 522 of mechanically moving at least one component of the airborne imaging sensor with respect to a carrying airborne platform, for compensating for the motion of the airborne imaging sensor with respect to the crops during the acquiring.

The motion compensation in stage 520 may reduce the relative speed between the imaged location and the light recording part to substantially zero, or simply reduce it enough so that the effects of the relative motion between the two on the quality of the image are lower than a predefined threshold.

If, as aforementioned, the motion compensation by rotating parts of the airborne imaging sensor starts during the focusing stage, it is noted that the focusing may start while the optical axis of the light acquisition is diagonal to the horizon, and the actual acquisition of image data may take place in the part of the rotation movement in which the optical axis towards the imaged crop (e.g. the imaged leaf) is perpendicular to the horizon.

Optionally, the acquiring of stage 520 may include: mechanically rotating at least one optical component of the airborne imaging sensor (e.g. rotating mirror 213, mirror prism 212, etc.) with respect to a carrying airborne platform, for compensating for the motion of the airborne imaging sensor with respect to the crops during the acquiring, and concurrently to the rotation of the at least one optical component, for each frame out of a plurality of frames of the image data: initiating a focusing process of the imaging sensor when an acquisition optical axis is at a degree wider than 20° from the vertical axis, and acquiring the image data using vertical imaging, when the acquisition optical axis is at a degree smaller than 20° from the vertical axis. The acquisition optical axis is the line connecting a center of an imaged location of the agricultural area in a given frame (the area covered by the specific image frame), and a center of an opening (e.g. transparent window 219) through which light enters the imaging system towards the rotating optical component.

Generally, whether motion compensation is used or not, the acquiring of the image data at stage 520 may include acquiring some or all of the image data using vertical imaging (either strictly vertical or steep oblique imaging, e.g. less than 20 degrees from the vertical).

In addition or instead, other motion compensation techniques may optionally be implemented a part of method 500. For example, stage 520 may include stage 523 of illuminating the crops during the acquiring, for compensating for the motion of the airborne imaging sensor with respect to the crops during the acquiring. The illuminating of stage 523 may include flash illumination, steady illumination (at least for the duration of the acquisition, but may be significantly longer), or other types of illumination. Optionally, the illuminating may starts when a focusing process which precedes image acquisition begins.

As mentioned above, acquiring the image data (and especially image data of submillimetric resolution) from the airborne platform as disclosed with respect to method 500 enables collecting image data of agricultural and agronomic significance at places which are otherwise unreachable, inaccessible, or where access would be slow, dangerous, expensive and/or harming to the crops. For example leaves at treetops may be imaged, as well as plants which are located within dense vegetation or over rough terrain. Optionally, stage 520 may include stage 524 of acquiring image data of parts of the agricultural area which are inaccessible to land vehicles. While it may be possible to design and manufacture a land vehicle which can reach treetops of rainforest trees, it is complicated and expensive to do so, and possibly harmful to the natural environment. The inaccessibility of stage 524 pertains especially to land vehicles which are commonly used in agriculture, such as tractors, pickup trucks, center pivot irrigation equipment, combine harvesters, cotton picket, etc. It is noted that stage 520 may include acquiring image data of parts of the agricultural area which are inaccessible by foot (i.e. to a man walking, hiking, etc.).

As also mentioned above, the image data acquired by the imaging sensor in stage 520 does not necessarily represent all of the agricultural area, and it may also image a representing sample thereof.

The relative part of the agricultural area which is imaged by the imaging sensor may differ between different types of crop. A different definition of minimal converge area may be defined for each type of crop. A bench mark which may be used for such definition of coverage area out of full field is the comparison to the coverage which may be achieved by a ground human inspector walking by foot, or higher percent. For example, i.e. if a foot inspector is expected to examine a non-random 2-3% of the field that are focused on the outer area of the field when the foot inspector can pass by foot and/or car, the flight path may be planned so that it will generate a random coverage including also the inner part of the field (and not only outer coverage) of at least 3-5%.

Optionally, stage 520 may include stage 525 of acquiring image data of the agricultural area at a coverage rate of under 500 square meters per hectare (i.e. less than 5% of the agricultural area is covered by the image data).

It is noted that stage 520 may include stage 526 of focusing the imaging sensor, prior to the collection of light by the imaging sensor. It is noted that the focusing of the imaging sensor may be difficult, especially if executed while the airborne platform flies in significant speeds (e.g. above 10 m/s, at velocities which do not fall below 50% of the average speed of the airborne platform along the flight path, etc., e.g. as discussed with respect to stage 521). The focusing may be affected not only from motion which results from motion of the airborne platform with respect to the imaged location, but also from movement within the imaging system (e.g. as discussed with respect to stage 522). It is noted that operational parameters of the imaging system (e.g. system 200) and/or of the carrying airborne platform may be selected so as to enable the focusing. For example, the maximum altitude above the top of the crops may be selected in order to enable efficient focusing of the imaging sensor during flight.

Stage 530 of method 500 includes processing the image data by an airborne processing unit, to provide image data content which includes high quality images of leaves of the crops. The airborne processing unit is carried by the same airborne platform which flies the airborne imaging sensor over the agricultural area. Referring to the examples set forth with respect to the previous drawings, stage 530 may be carried out by processor 220.

The processing of stage 530 may include filtering the image data (e.g. to discard image data which is not quality enough, or selecting a representative image for each area), compressing the image data, improving the image data (e.g. applying image enhancement processing algorithms to which), selecting agronomic significant data, or any combination of the above, as well as other possible processing techniques which are known in the art.

For example, the processing of stage 530 may include processing the acquired image data in order to filter out acquired images which are not quality enough, analyzing the remaining images to identify leaves of the crops of the agricultural area (e.g. based on leaf identification parameters preloaded to the processing module) in some of the acquired images, selecting out of the images which include identifiable leaves in high quality a representing sample, and compressing the selected images to provide the image data content to be transmitted to an external system.

During the flight path and the image gathering the airborne system may optionally perform an initial image analysis, e.g. to define photo quality, blur level and image resolution to exclude images that are not in the minimal requirement of the remote image analysis server, thus save analysis time and data transfer to remote locations, whether server or interface of end product.

As mentioned above, stage 540 includes transmitting to an external system image data content which is based on the image data acquired by the airborne imaging sensor.

Stage 540 may include stage 541 of transmitting the image data content to the external system for displaying to an agronomist at a remote location agronomic image data which is based on the image data content, thereby enabling the agronomist to remotely analyze the agricultural area. It is noted that the image data content may be transmitted to the external system directly or via an intermediate system (e.g. a server), and that the external system may display the agronomic image data directly to the agronomist, or provide to another system information which enable the display to the agronomist of the agronomic image data (e.g. a handheld computer of the agronomist, such as a smartphone). It is noted that such agronomic image data (e.g. selected images of infected leaves) may be transmitted to one or more agronomists and/or to other entities, e.g. as discussed with respect to FIG. 4B. Additional details with respect to optional stage 541 are discussed below.

Figure 5D:
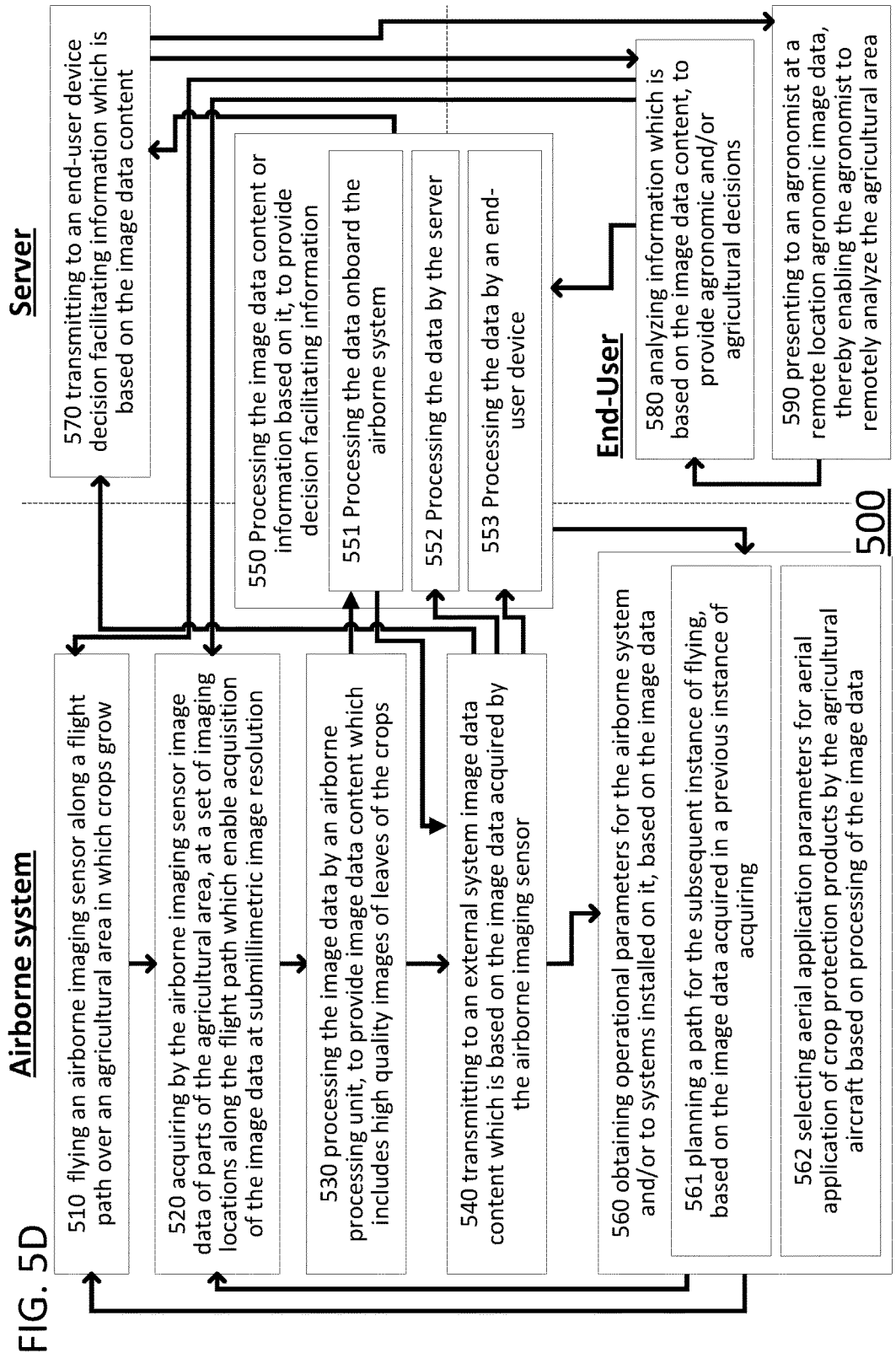

Few of the optional stages which may be included in method 500 are illustrated in FIG. 5D. It is noted that different routes are illustrated between stage 530 and any higher numbered stage are optional, and that some stages may be reached in different ways in different implementations of method 500. For example, stage 580 may be executed directly following stage 540, or following an intermediate execution of stage 550 (which may include different combinations of sub stages of stage 550). It is noted that while all of the illustrated routes (indicating order of execution) of stages in FIG. 5D, these routes do not exhaust all the possible options, and additional routes may also be chosen, depending on various considerations which will naturally present themselves to a person who is of skill in the art.

The image data content may be processed and used in various ways. It may be used as a basis for various decisions and actions—such as in what ways the crops should be treated, which further monitoring of the agricultural area is required, how crops in adjacent (or even remote) agricultural areas should be treated, when are the crops expected to ripen, what quantity of crops is the agricultural area expected to yield and at which times, and so on.

Method 500 may include processing the image data content (or information based on it) to provide decision facilitating information. The processing may be executed by an airborne processor carried by the airborne system (denoted 551), by a server (denoted 552), and/or by an end-user device (denoted 553). The processing may involve human input (e.g. in the end-user device, where the agronomist can enter instructions based on her analysis of the image data content, or to mark for the grower farmer what signs to look for in order to see whether a suggested treatment is working.

For example, the processing of stage 550 may include detecting of individual leaves, and cropping only the leaves from the image data, as exemplified in FIG. 14. FIG. 14 illustrates cropping of individual leaves from the image data, in accordance with examples of the presently disclosed subject matter. The image 1000 may be processed to detect leaves edges (image 1010), and then parts of the imaged may be removed, to provide image including only information of individual leaves (image 1020). The leaves cropping—or other image processing algorithms applied to the image data may be based on multi-season, multi-variety database of leaves images, parameters, and/or data.

The processing or stage 530 may provide, for example, any one or more of the following: Leaf size statistics, Leaf density statistics, Leaf color & Spectral analysis and Morphologic statistics.

The image data content may be processed and used in various ways. Optionally, it may be transmitted to one or more entities, e.g. as discussed above (for example, with respect to FIG. 4B). The image data content may also be used to determine parameters for the airborne system which executes method 500. Such parameters may be parameters which pertain to the acquisition of further image data in another instance of method 500, may be aerodynamic parameters or operational parameters for the airborne platform, may be operational parameters for another system carried by the airborne platform (e.g. agricultural spraying parameters), and so on.

Method 500 may include stage 560 of obtaining operational parameters for the airborne system and/or to systems installed on it, based on image data collected in stage 520. Referring to the examples set forth with respect to the previous drawings, stage 560 may be executed by communication module 230.

Optionally method 500 may include planning a following flight based on the image data content obtained in method 500. The planning may be based on the image data content and on agricultural considerations and/or on additional considerations. Method 500 may include another instance of stage 510, 520, 530 and 540 following stage 540. In such case, method 500 may include stage 561 of planning a path for the subsequent instance of flying, based on the image data acquired in a previous instance of acquiring.

Optionally, method 500 may include stage 562 of selecting aerial application parameters for aerial application of crop protection products by the agricultural aircraft based on processing of the image data.

All of the stages discussed above are performed on-board the airborne platform which carries the imaging sensor used for the acquiring of stage 520 (where stage 550 may also be performed—partially or fully—on remote systems). Other process stages may also be performed by other entities (not carried by the airborne platform), such as a server or end-user units.

Optional stage 570 includes transmitting to an end-user device, by a server which is located away from the airborne platform, decision facilitating information which is based on the image data content. Referring to the examples set forth with respect to the previous drawings, stage 570 may be executed by server 300. The transmitting may be executed wirelessly and/or over wired communication media, and may be facilitated by one or more intermediate systems (e.g. internet routers, etc.). Various examples to the information which is based on the image data content and which may facilitate decisions are provided above, as well as examples to decision which may be thus taken.

Optional stage 580 includes analyzing information which is based on the image data content, to provide agronomic and/or agricultural decisions. Referring to the examples set forth with respect to the previous drawings, stage 580 may be executed by an end-user device such as a computer used by a farmer or an agronomist (whether a portable computer or not), by a user interface (UI) connected directly to the server, and so on. It is noted that the analysis of stage 580 may be completely computerized (e.g. using only dedicated hardware, software and/or firmware), or to involve to various degrees human input (e.g. the agronomist analyzing received images of leaves, based on years of professional experience). The outcomes of stage 580 may be transmitted to any one of the other entities (e.g. the server, the airborne system, and so on).

Method 500 may include stage 590 of presenting to an agronomist at a remote location (i.e. remote from the agricultural area, possibly in another country) agronomic image data which is based on the image data content, thereby enabling the agronomist to remotely analyze the agricultural area. Referring to the examples set forth with respect to the previous drawings, stage 590 may be executed by an end-user device such as a computer used by a farmer or an agronomist (whether a portable computer or not), by a user interface (UI) connected directly to the server, and so on.

Reverting to stage 550 which includes processing the image data content or information based on it to provide decision facilitating information, it is noted that the processing may include various processing procedures.

Stage 550 may include stage 554 of applying computerized processing algorithms to the image data content (either directly, or indirectly on information which is based on the image data content) for detecting diseases and/or indication of parasites effect on the leaves in one or more plants in the agricultural area. It is noted that the detection of diseases in stage 554 may be used as a basis for further analysis, either computerized or not. For example, the computerized processing algorithms may be used for detection of leaves which were eaten by parasites, and these images may then be transferred to an agronomist for assessing the type of the parasite, and which measures should be taken to assist the crops.

Stage 550 may include stage 555 of determining health parameters for large scale level (e.g. for entire field, for a hectare of forest, a county, a country, etc.), based on high resolution images of many individual plants in the agricultural area. Such parameters may include, by way of example, irrigation gaps or general level of irrigation, nitrogen, leaf disease above certain coverage that is significant to the entire field, per crop and time in the growing season, as in a possible cases of late blight, or in the case of insects such as Colorado Beatle, in which reaching a certain identification, in a scattered location on the field as can be defined by GPS location of the photos in which it was identified, will define the entire field as infected. Additional parameter is emergence percentage in early stage of growing defined by the scattered flight pattern of the low flying and enable defining emergence in full field level.

Stage 550 may include stage 556 of processing image data acquired at different times over multiple weeks, for determining growth parameters for the plants in the agricultural area. The image data may be acquired over multiple weeks by reiterating the stages of flying, of acquiring and of transmitting several times over multiple weeks. The reiteration of these stages may be executed by a single airborne systems, or by different airborne systems.

Stage 550 may include stage 557 of applying computerized processing algorithms to the image data (directly or indirectly, e.g. to the image data content) for identifying selected agronomic significant data, and generating agronomic image data for transmission to a remote system based on the selected agronomic significant data. This may be used, for example, to determine which data to send for reviewing by the agronomist.

Stage 550 may also include which selecting the addressee of the processed information, e.g. to which agronomist (or another expert or system) the information should be communicated. Stage 550 may include stage 558 of applying computerized processing algorithms to the selected agronomic significant data for selecting, out of a plurality of possible recipients, a recipient for the agronomic image data, based on agronomic expertise of the possible recipients.

FIG. 6 is a flow chart illustrating an example of method 700 for agricultural monitoring, in accordance with examples of the presently disclosed subject matter. Referring to the examples set forth with respect to the previous drawing, method 700 may be executed by system 10. Method 700 is an example of method 500, and the stages of method 700 are numbered in corresponding reference numerals to these of method 500 (i.e. stage 710 is an example of stage 510, stage 720 is an example of stage 520, and so on). It is noted that variations and examples discussed with reference to method 500 (either above or below in the disclosure) are also relevant for method 700, where applicable.

Method 500, as implemented in the example of method 700, includes using an airborne imaging sensor carried by an aircraft flying at very low altitudes for acquiring extremely high-resolution images of agricultural crops at high-rate (sampling large areas of the agricultural area in relatively little time). The image data content generated on the airborne system is transmitted for processing at a remote off-site analysis server. The image data content is than processed by the analysis server, and afterwards it is distributed to a management interface (e.g. a personal computer, a handheld computer and so on), where it is provided to an agronomist, to a manager to another professional or to a dedicated system for further analysis. The high resolution of the images acquired in stage 720 enable analysis of individual leaf level, which may be used, for example, in order to detect leaves diseases or indication of parasites effect on the leaves.

Stage 710 of method 700 includes flying, by an agricultural airplane (e.g. a dusting plane, as illustrated in FIG. 6), an airborne digital camera over a potato field in which potatoes grow, at velocities of between 10 and 15 m/s along a flight path which includes a plurality of low altitude imaging locations of about 40 feet above the crop level, which enable acquisition of the image data at submillimetric image resolution.

Stage 720 of method 700 includes acquiring by the airborne digital camera image data of parts of the potatoes field at submillimetric resolutions of about 0.4 mm. The ground area covered by the digital camera in a single image is illustrated by the trapezoid drawn over the field.

Stage 730 of method 700 includes processing the image data by an airborne processing unit carried onboard the agricultural airplane, to provide image data content which includes high quality images of leaves of the potatoes. In the illustrated example, part of the image acquired in stage 720 is cropped, so that only the area around detected suspected points in the acquired image are prepared for transmission in stage 740. In the illustrated example, the suspected point are actually leaf areas which demonstrate early stages of blight.

Stage 740 of method 700 includes wirelessly transmitting to an off-site remote server the image data content, for distribution to end-users, such as an agronomist.

Figure 7:
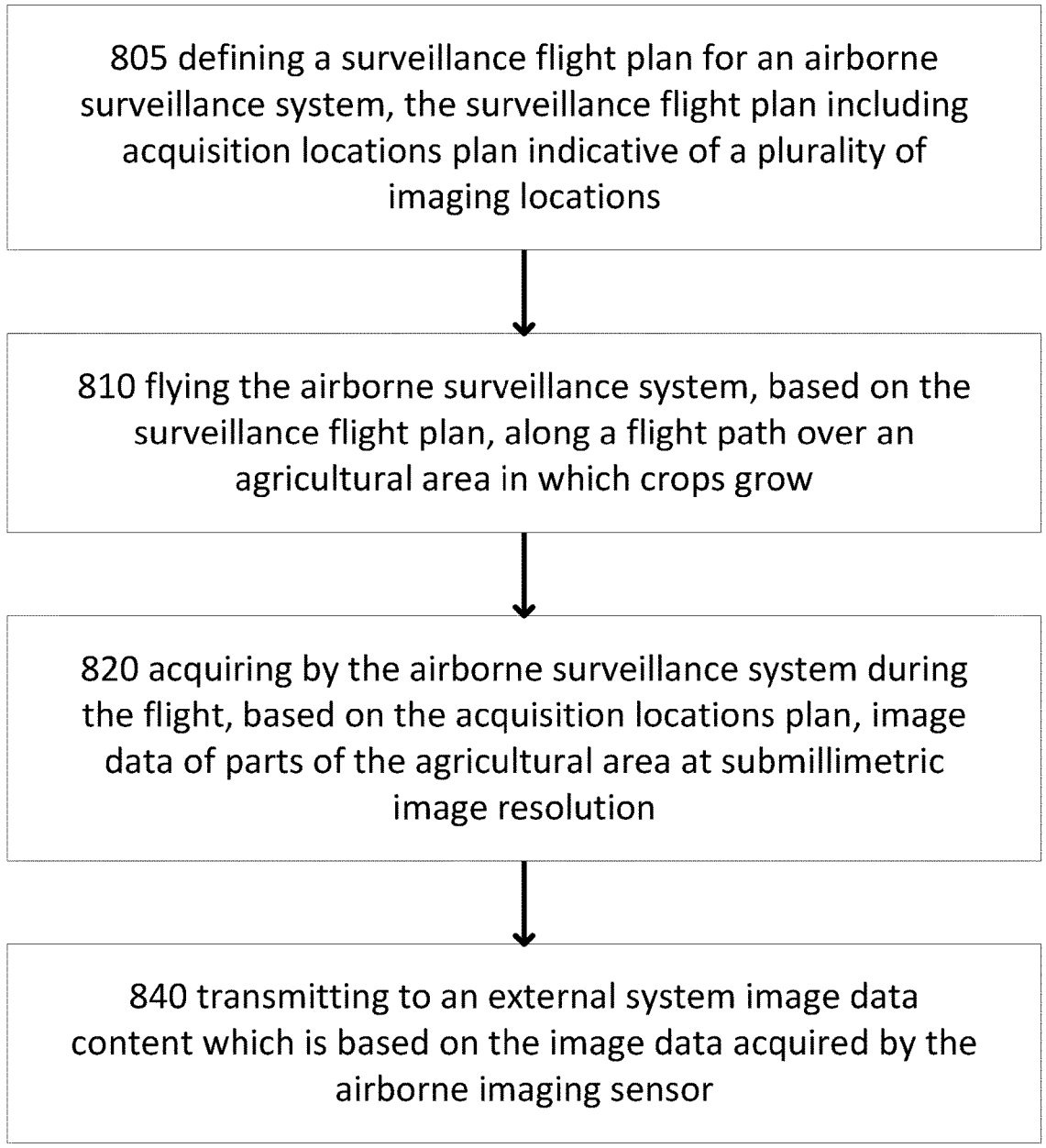
FIG. 7 is a flow chart illustrating an example of a method for agricultural monitoring, in accordance with examples of the presently disclosed subject matter.

FIG. 7 is a flow chart illustrating an example of method 800 for agricultural monitoring, in accordance with examples of the presently disclosed subject matter. Referring to the examples set forth with respect to the previous drawing, method 800 may be executed by system 10. Additional discussion and details pertaining to system 10 are provided below, following the discussion pertaining to method 800.

Method 800 includes a stage of defining a surveillance flight plan (stage 805 which is discussed below), which are followed by acquiring and utilizing image data of an agricultural area, based on the surveillance flight plan. The stages of method 800 which follow stage 805 may be variations of the corresponding stages of method 500 (corresponding stages of these two methods are numbered in corresponding reference numerals, i.e. stage 810 corresponds to stage 510, stage 820 corresponds to stage 520, and so on). It is noted that variations and examples discussed with reference to method 500 are also relevant for method 800, where applicable, mutatis mutandis. Where applicable, the relevant variations of stages 510, 520 and possibly also 530, 540 and following stages, may be implemented in the corresponding stages of method 800 (i.e. 810, 820, and so on) as executed based also on the surveillance flight plan defined in stage 805.

Stage 805 of method 800 includes defining a surveillance flight plan for an airborne surveillance system, the surveillance flight plan including acquisition locations plan indicative of a plurality of imaging locations.

Referring to the examples set forth with respect to the previous drawings, stage 805 may be executed by different entities, such as airborne system 10, server 300, and end-user device (e.g. of agronomist 992, of farmer 993, of a not-illustrated planning center, and so on), or any combination thereof (e.g. a plan may be suggested by agronomist 992, and then revised by the airborne system 10 based on meteorological conditions).

The defining of stage 805 may be based on various considerations. For example, the surveillance flight path and possibly additional parameters may be defined so as to enable image acquisition at the required qualities. Stage 805 may include, for example, the following substages:

- Based on information obtained from the client, defining the desired agricultural areas (also referred to as "plots");
- Receiving geographic information system (GIS) information of the plots, as well as information regarding the plot structure (such as information GIS information regarding irrigation pipes, roads or other aspects of the plot structure).
- Optionally, receiving information regarding the crops growing in the agricultural area, such as type of crops, crop age (since planting thereof), variety, etc.
- Based on the GIS information (possibly using also additional information), defining plot topography and obstacles in each plot and around the plots such as irrigation systems deployed in the field, high trees electricity lines, fixed machinery and others.
- Defining a surveillance flight path plan using a flight plan tool, the surveillance flight plan being defined with respect to each crop and per plot with general guidelines per crop (e.g. potatoes or other flat crops filed are aimed at plots of 5-20 HA, each plot receives high altitude photo by single shot from high altitude. The single high altitude shot is planned by GPS coordinates to the center of the field with the magnetic heading of the entire field in order to get a straight high altitude photo in a single shot. The low altitude are planned at this stage to set a flight path. The low altitude flight path is planned an X pattern, 10-20 meters gap between photos for low altitude extreme resolution). These definitions change per crop family or by specific request from client. It is noted that optionally, the same flight path is conducted on each plot several times throughout the season.

It is noted that the surveillance flight plan may be updated. For example, on the day of the actual flight (if the surveillance flight plan is defined in advance), the flight crew and/or local contact may reach the agricultural area, and verify obstacles for low flight, cheek wind for optimizing flight routes by flying head or tail wind (e.g. preferably taking photos with head wind, rather than cross wind).

Stage 810 of method 800 includes flying the airborne surveillance system, based on the surveillance flight plan, along a flight path over an agricultural area in which crops grow. Referring to the examples set forth with respect to the previous drawings, the airborne surveillance system may be imaging sensor 210 or the entire airborne system 10, and the flying of stage 810 may be executed by airborne platform 100. It is noted that all the optional variations, implementations and sub-stages discussed with respect to stage 510 may be adapted to pertain to stage 810, which is executed based on the surveillance flight plan.

Stage 820 of method 800 includes acquiring by the airborne surveillance system during the flight, based on the acquisition locations plan, image data of parts of the agricultural area at submillimetric image resolution. Referring to the examples set forth with respect to the previous drawings, the airborne surveillance system may be imaging sensor 210 or the entire airborne system 10. It is noted that all the optional variations, implementations and sub-stages discussed with respect to stage 520 may be adapted to pertain to stage 820, which is executed based on the surveillance flight plan.

Method 800 may include optional stage 830 (illustrated in FIG. 8), which includes processing the image data by an airborne processing unit, to provide image data content which includes high quality images of leaves of the crops. The airborne processing unit is carried by the same airborne platform which flies the airborne surveillance system over the agricultural area. Referring to the examples set forth with respect to the previous drawings, stage 830 may be carried out by processor 220. It is noted that all the optional variations, implementations and sub-stages discussed with respect to stage 530 may be adapted to pertain to stage 830. Stage 830 may be executed based on the surveillance flight plan defined in stage 805, but this is not necessarily so. For example, the processing of optional stage 830 may be based on information regarding the type of crops or of types of diseases looked for, which is included in the surveillance flight plan. It is noted that the surveillance flight plan (or a more general plan defined for the surveillance flight, a plan which includes the surveillance flight plan as well as additional information) may include parameters and/or instructions which affect the processing of optional stage 830 (e.g. instructions as of to how much information should be transmitted to an external system in stage 840).

It is noted that method 800 may also include processing of the image data for providing other decision facilitating information, similarly to the processing discussed with respect to stage 550 (e.g. with respect to stage 551). Like stage 830, such processing of the image data may be based on the surveillance flight plan, but this is not necessarily so.

Stage 840 of method 800 includes transmitting to an external system image data content which is based on the image data acquired by the airborne surveillance system. Referring to the examples set forth with respect to the previous drawings, the transmitting of stage 840 may be executed by communication module 230. It is noted that all the optional variations, implementations and sub-stages discussed with respect to stage 520 may be adapted to pertain to stage 820, which is executed based on the surveillance flight plan.

Method 800 may also include stages 850, 860, 870, 880 and 890, which correspond to stages 550, 560, 570, 580 and 590 respectively. Each out of stages 850, 860, 870, 880 and 890 may include sub-stages which correspond to the previously discussed sub-stages of the corresponding stages 550, 560, 570, 580 and 590 of method 500. Each one of stages 850, 860, 870, 880 and 890 (and their sub-stages) may be based on the surveillance flight plan defined in stage 805, but this is not necessarily so.

Figure 8:
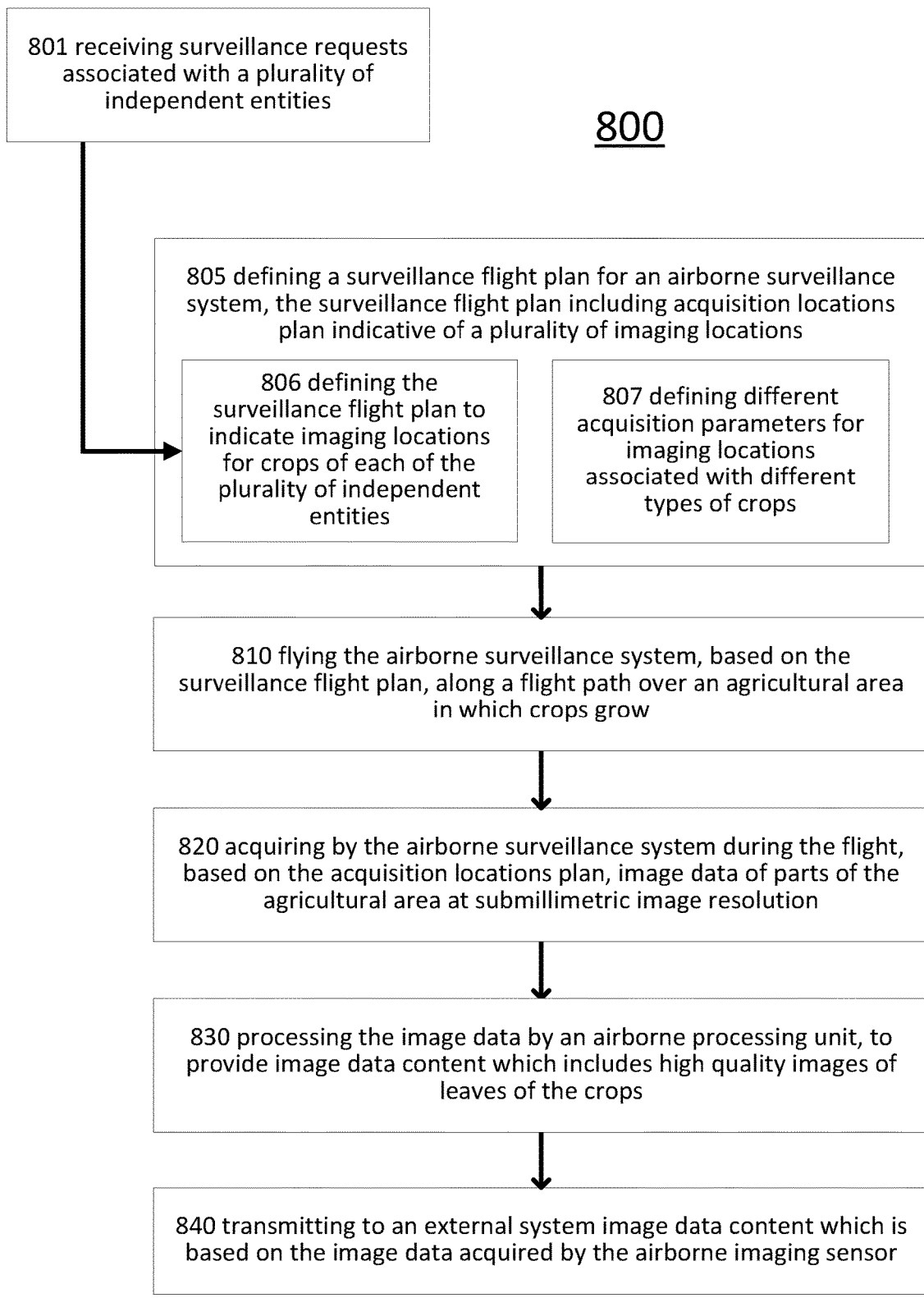
FIG. 8 is a flow chart illustrating an example of a method for agricultural monitoring, in accordance with examples of the presently disclosed subject matter.

FIG. 8 is a flow chart illustrating an example of method 800 for agricultural monitoring, in accordance with examples of the presently disclosed subject matter. Method 800 may optionally include stage 801 (which precedes stage 805), which includes receiving surveillance requests associated with a plurality of independent entities. Stage 805 in such a case may include stage 806 of defining the surveillance flight plan to indicate imaging locations for crops of each of the plurality of independent entities. Such entities, as discussed above, may be different agricultural areas (e.g. a field and an orchard), agricultural areas of different clients (e.g. a field of one client and another field belonging to another client), and so on.

As discussed with respect to method 500 above (e.g. with respect to FIG. 4A), more than one type of crop may grow in the agricultural area. Stage 805 may include stage 807 of defining different acquisition parameters for imaging locations associated with different types of crops.

Such acquisition parameters may include operational parameters of the airborne platform (e.g. velocity, altitude above ground level, stability, etc.) and/or parameters of the airborne surveillance system and especially of its sensor (e.g. exposure time, f-number, lens focal length, resolution, detector sensitivity, speed compensation, etc.).

Figure 9:
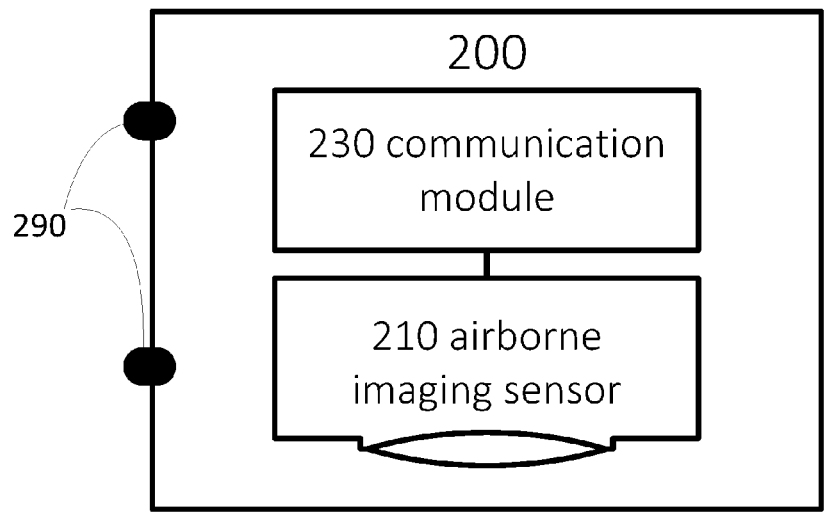
FIG. 9 is a functional block diagram illustrating an example of an agricultural monitoring system, in accordance with examples of the presently disclosed subject matter.

FIG. 9 is a functional block diagram illustrating an example of agricultural monitoring system 200, in accordance with examples of the presently disclosed subject matter. Some components of agricultural monitoring system 200 (also referred to as system 200, as a matter of convenience) may have analogue structure, function and/or role in system 10 (and vice versa), and therefore same reference numerals were used to indicate such analogue components. It is noted that different components of system 200 may execute different stages of methods 500, 600, 700 and 800 (e.g. as indicated below), and that system 200 as a whole may execute processes which include two or more stages of these methods.

Agricultural monitoring system 200 includes at least imaging sensor 210, communication module 230 and connector 290, and may include additional components such as (although not limited to) those discussed below.

Imaging sensor 210 is configured and operable to acquire image data at submillimetric image resolution of parts of an agricultural area 900 in which crops grow, when the imaging sensor is airborne. Imaging sensor 210 is airborne in the sense that it is operable to acquire image data while being flown by an aircraft. It is nevertheless noted that imaging sensor 210 may also be used for capturing images also when not being carried by an aircraft. Furthermore, a standard imaging sensor (e.g. a standard digital camera such as Canon EOS 60D or Nikon D3200) may be used as imaging sensor 210.

It is noted that while at least part of the image data acquired by imaging sensor 210 is acquired in submillimetric resolution, imaging sensor 210 may optionally also acquire image data of parts of the agricultural area in lower resolutions (e.g. GSD of 2 mm, of 1 cm, etc.). Imaging sensor 210 may be configured to acquire image data in lower resolution, if implemented, using the same configuration as used for the submillimetric resolution acquisition (e.g. if the airborne platform which carries imaging sensor 210 flies in higher altitude), or using another configuration. Such other configuration may be used, for example, to acquire orientation quality images (e.g. having GSD of 2 cm), to which the high resolution image data may be registered.

As discussed above with respect to stage 520 of method 500, imaging sensor 210 may be operable to acquire image data of parts of the agricultural area at an image resolution which is finer by at least one order of magnitude than an average leaf size of the imaged crop. That is, in at least part of the image data, a plurality of leaves of the crop are imaged in a resolution which enables resolving at least ten independently resolvable parts of the leaf. A different intensity level may be measured for each one of these resolvable parts of the leaf. Optionally, imaging sensor 210 may be operable to acquire image data of parts of the agricultural area at an image resolution which is finer by at least two orders of magnitude than an average leaf size of the imaged crop (and optionally finer by at least three orders of magnitude).

Different kinds of imaging sensors 210 may be used as part of system 200. For example, image sensor 210 may be a semiconductor charge-coupled devices (CCD) image sensor, a complementary metal-oxide-semiconductor (CMOS) image sensor or an N-type metal-oxide-semiconductor (NMOS) image sensor. It is noted that more than one imaging sensor 210 may be included in system 200. For example, system 200 may include a first airborne imaging sensor for low altitude photography of the agricultural area, and a second imaging sensor 210 for high altitude orientation photography of the agricultural area (and possibly of its environment as well). Furthermore, system 200 may include imaging sensors 210 of different types. For example, system 200 may include imaging sensors 210 which are sensitive to different parts of the electromagnetic spectrum.

In addition to any optics which may be incorporated into imaging sensor 210, system 200 may further include additional optics (e.g. elements 211, 212 and 213 in FIG. 11A) for directing light from the agricultural area onto a light collecting surface of imaging sensor 210 (e.g. optional lens 211). Such additional optics may manipulate the light it collects before directing it onto imaging sensor 210. For example, the additional optics may filter out parts of the electrical spectrum, may filter out and/or change polarization of the collected light, and so on.

Optionally, system 200 may be used to image parts of the agricultural area in a low altitude flight (e.g. lower than 10 m over the ground, e.g. lower than 20 m over the ground, e.g. lower than 30 m over the ground). Optionally, imaging sensor 210 may be configured and operable to acquire the image data at altitude smaller than 20 meters above the top of the crops growing in the agricultural area.

The selection of operational flight altitude for system 200 may depend on several factors. First, the altitude of the airborne system above the agricultural area determined the amount of light which reaches imaging sensor 210, and thus the exposure time and the aperture which may be used for collecting light during the acquisition of the image data. Thus, while the low flight may limit the field of view of the imaging sensor, it enables acquisition of image data using short exposure time and small aperture, thereby facilitating capture of image data by system 200 when flying at considerable speeds.

Another consideration when determining the operational flight altitude is the noises and cancelation thereof, especially when acquiring the image data when flying at considerable speeds (e.g. over 10 m/s). As discussed with respect to motion compensation, one of the ways in which compensation for the movement of the airborne platform during acquisition may be achieved by rotating imaging sensor 210 with respect to the agricultural area, or rotating an optical component (e.g. mirror prism 212 or rotating mirror 213) which direct light from the agricultural area onto imaging sensor 210. In such cases, the rotation speed of the rotating optics should compensate for the angular velocity of the airborne system with respect to a fixed point on the agricultural area (e.g. the center of an acquired image data frame). Given a fixed linear velocity v of the airborne platform (assuming it flies perpendicular to the ground), the angular velocity of the airborne platform with respect to the ground is inversely proportional to the altitude of the airborne platform above the ground.

However, the actual angular velocity of airborne platform with respect to the agricultural area depends not only on its flight velocity and altitude, but also on noises and movements (pitch, yaw, roll, vibrations, drift, etc.). The angular velocity is therefore consisting of the component resulting from the flight speed of the airborne platform and from a component resulting from such noises. If V is the horizontal flight velocity of the airborne platform and R is its altitude above ground, than the angular velocity is $$\omega_{real} = \omega_{flight} + \omega_{noise} = \frac{v}{R} + \omega_{noise}.$$

Thus, flying in low altitude reduces the relative effect of the noises on the angular velocity, and improves image quality. It is noted that the angular velocity of the rotating optical component may also be determined based on information regarding $\omega_{noise}$, such as information regarding the motion of the airborne platform collected by IMU 270.

System 200 further includes communication module 220, which is configured and operable to transmit to an external system image data content which is based on the image data acquired by the airborne imaging sensor. The external system is a system which is not part of system 200, optionally one which is not installed on the aircraft which carries system 200). It is noted that communication module 230 may be operable to transmit image data content directly to an external system which is located away from the airborne platform which carries system 200. Optionally, communication module 230 may be operable to transmit image data content to such a remote system by communicating it via a communication module of the airborne platform (or a communication system installed on the airborne platform). For example, if the airborne platform is equipped with radio connection and/or with satellite communication channel to a ground unit, than communication module 230 may transmit the image data content to the radio unit and/or to the satellite communication unit, which in turn would transmit it to the ground unit. As discussed with respect to stage 540 of method 500, communication module 230 may be operable to transmit the image data content to the external system wirelessly. As discussed with respect to stage 540 of method 500, communication module 230 may be operable to transmit the image data content to the external system in real time (or in near real time).

Different kinds of communication modules 230 may be used as part of system 200. For example, internet communication module may be used, optical fiber communication module, and satellite based communication module may be used.

Communication module 230 may optionally be an airborne communication module in the sense that it is operable to transmit image data while being flown by an aircraft. It is nevertheless noted that communication module may transmit the image data content also when the aircraft is back on the ground. System 200 may be connected to the airborne platform when communication module transmits the image data content, but this is not necessarily so.

System 200 further includes connector 290 which is operable to connect imaging sensor 210 to an airborne platform. The connection of the imaging sensor 210 to the airborne platform is a mechanical connection (i.e. these two objects remain spatially close to each other because of the connector), even if the means of connection are not mechanical (e.g. electromagnetic or chemical connection).

Different kinds of connectors 290 may be used for connecting imaging sensor 210. For example, any of the following connector types (as well as any combination thereof) may be used for connector 290: Glue; welding; one or more screws, mechanical latches, clamps, clasps, rivets, clips, and/or bolts; hook and loops fasteners; magnetic and/or electromagnetic fasteners, and so on.

It is noted that connector 290 may connect imaging sensor 210 to the airborne platform directly (i.e. when the sensor touches the platform either directly or with the connector as the only separation) or indirectly (e.g. connecting a casing of system 200 to the airborne platform, where imaging sensor 210 is connected to the casing).

It is noted that connector 290 may connect other components of system 200 to the airborne platform—wither directly or indirectly. For example, one or more connectors 290 may be used to connect communication module 230, optional processor 220, and/or an optional casing (not denoted) of system 200 to the airborne platform. Each one of these components may be connected by connector 290 to the airborne platform either directly or indirectly. It is noted that connector 290 may include many connecting parts, which may be used for connecting different parts of system 200 to the airborne platform. Referring to the example of FIGS. 1A-1C, connector 290 may include a welding which welds communication module 230 to the rear part of the aircraft, as well as four screws connecting imaging sensor 210 to the front of the aircraft.

It is noted that connector 290 may be operable to connect one or more components of system 200 to the airborne platform in a detachable manner (e.g. using screws, hook and loop fasteners, snaps, etc.). It is noted that connector 290 may be operable to connect one or more components of system 200 to the airborne platform in an undetachable manner (e.g. using welding, glue, etc. While such a connector may be detached using specialized means, it is not designed to do so regularly, or more than once). Imaging sensor 210 may be connected to the airborne platform using detachable and/or undetachable connector 290. Using a detachable connector 290 may be useful, for example, if system 200 is a portable unit which is connected to different aircrafts based on needs (e.g. attached to spraying agricultural aircrafts according to a spraying plan for the day).

Figure 10:
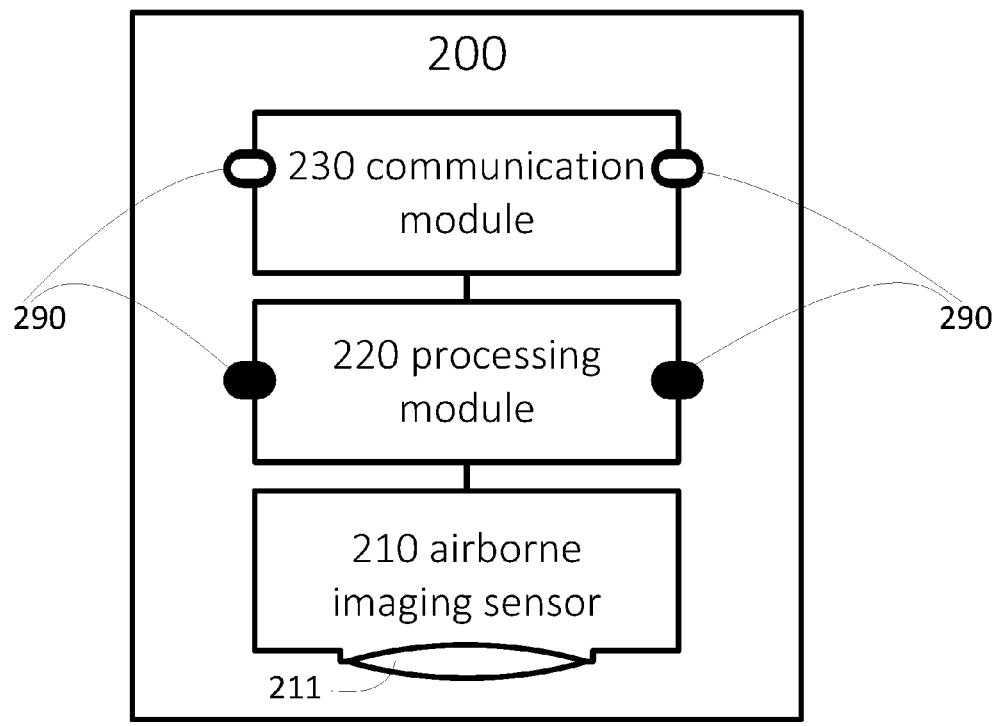
FIG. 10 is a functional block diagram illustrating an example of an agricultural monitoring system, in accordance with examples of the presently disclosed subject matter.

FIG. 10 is a functional block diagram illustrating an example of agricultural monitoring system 200, in accordance with examples of the presently disclosed subject matter.

Optionally, system 200 may include processor 220. Processor 220 is operable to receive image data acquired by imaging sensor 210, to process the data, and to transfer to another component, unit or system information which is based on the processing of the image data (such information may include for example instructions, image data content, etc.). It is noted that optional processor 220 may base its processing on another sources of information in addition to the image data acquired by imaging sensor 210. Generally, processor 220 may be configured and operable to execute any combination of one or more of the processing, analyzing and computation processes discussed with respect to stages 530 and 550 of method 500.

Processor 220 includes hardware components, and may also include dedicated software and/or firmware. The hardware component of processor 220 may be specially designed in order to speed up processing of the image data. Alternatively (or in addition), general purpose processors (e.g. field programmable gate array, FPGA, AMD Opteron 16-core Abu Dhabi MCM processor, and so on).

For example, processor 220 may be configured and operable to process the image data content for detecting leaves diseases and/or indication of parasites effect on the leaves in one or more plants in the agricultural area. For example, processor 220 may be configured and operable to process the image data content for identifying selected agronomic significant data, and to generate agronomic image data for transmission to a remote system based on the selected agronomic significant data.

Optionally, imaging sensor 210 may be is configured and operable to acquire the image data while flown at velocities which exceed 10 m/s. Optionally, imaging sensor 210 may be is configured and operable to acquire the image data while flown at velocities which do not fall below 50% of the average speed of the airborne platform along the flight path or along an imaging flight leg 911, as discussed with respect to FIG. 4B.

Acquiring images when a carrying airborne platform is flying at relatively high speed may enable covering relatively large parts of the agricultural area. Covering large parts of the agricultural area may also be facilitated by sampling the agricultural area, acquiring image data from a representative sample of which (e.g. as discussed with respect to FIG. 4B). For example, system 200 may be operable to acquire image data of the agricultural area at a coverage rate of under 500 square meters per hectare.

FIGS. 11A, 11B, 11C and 11D are functional block diagrams illustrating examples of agricultural monitoring system 200 with motion compensation mechanisms, in accordance with examples of the presently disclosed subject matter.

In the example of FIG. 11A, the motion compensation is achieved by a rotating mirroring prism through which light is directed to imaging sensor 210. In the example of FIG. 11A, system 200 includes one or more mechanical connections 241 (a shaft, in the illustrated example) which connects at least one component of imaging sensor 210 (in this case—mirroring prism 212) to an engine 240. By mechanical connection 241, motion of engine 240 mechanically moves the at least one component of imaging sensor 210 (in the illustrated example—it moves mirroring prism 212) with respect to a carrying airborne platform (not illustrated in FIG. 11A). The motion of the engine moves the respective component (or components) of imaging sensor 210 concurrently to the acquisition of image data by the imaging sensor 210. It is noted that as a matter of convenience only, mirroring prism 212, lens 211 and mirror 213 are illustrated outside of the box of imaging sensor 210, and in fact they belong to imaging sensor 210. It is noted that optical component may belong to imaging sensor 210, even if they are not enclosed in the same casing which holds a light sensitive surface of imaging sensor 210.

It is noted that other components which deflect light onto a light sensitive surface of imaging sensor 210 may be used instead of a prism (e.g. a rotatable mirror. In FIG. 11B, the entire imaging sensor 210 is moved by engine 240 with respect to the carrying airborne platform concurrently to the acquisition of the image data.

The movement of the one or more components of imaging sensor 210 with respect to the airborne platform may be used for compensating for the motion of the airborne imaging sensor with respect to the crops during the acquiring. Therefore, imaging sensor 210 may be operable within system 200 to acquire image data of the agricultural area when the carrying airborne platform in relatively high speeds (e.g. above 10 m/s), and therefore to yield high coverage rate of the agricultural area.

The speed in which mechanical connection 241 moves the respective components of imaging sensor 210 may be selected so that a relative speed between the light collecting surface of imaging sensor 210 (denoted 214 in FIG. 11B) and the imaged part of the agricultural area (in this instance of image data acquisition) is zero, or close to zero, but this is not necessarily so.

Imaging sensor 210 may include a focusing mechanism (not illustrated), for focusing the light arriving from part of the agricultural area onto a light sensitive surface of the imaging sensor 210. The focusing mechanism may be needed, for example, in order to allow acquisition of image data when flying in varying altitudes above the ground. The focusing mechanism may be operated automatically (by a focusing control processor, not illustrated). The focusing control processor may be configured and operable to focus optics of imaging sensor 210 when light from a first part of the agricultural area is projected onto a light collecting surface of imaging sensor 210, as imaging sensor 210 acquires later image data from a second part of the agricultural area which do not fully overlap the first part of the agricultural area. Referring to the example of FIG. 11B, this may be used, for example, for focusing the image when light arrives diagonally (with respect to the ground) to imaging sensor 210, and acquiring the image data when light from the agricultural area arrives to the imaging sensor 210 vertically.

Optionally, engine 240 may be operable to mechanically rotate at least one optical component of imaging sensor 210 with respect to the airborne platform (e.g. via one or more mechanical connections 241), for compensating for the motion of imaging sensor 210 with respect to the crops during the acquiring. Imaging sensor 210 in such cases may be configured and operable to: (a) initiate a focusing process concurrently to the rotation of the at least one optical component when an acquisition optical axis is at a degree wider than 20° from the vertical axis, and (b) acquire the image data using vertical imaging, when the acquisition optical axis is at a degree smaller than 20° from the vertical axis.

Figure 11C:
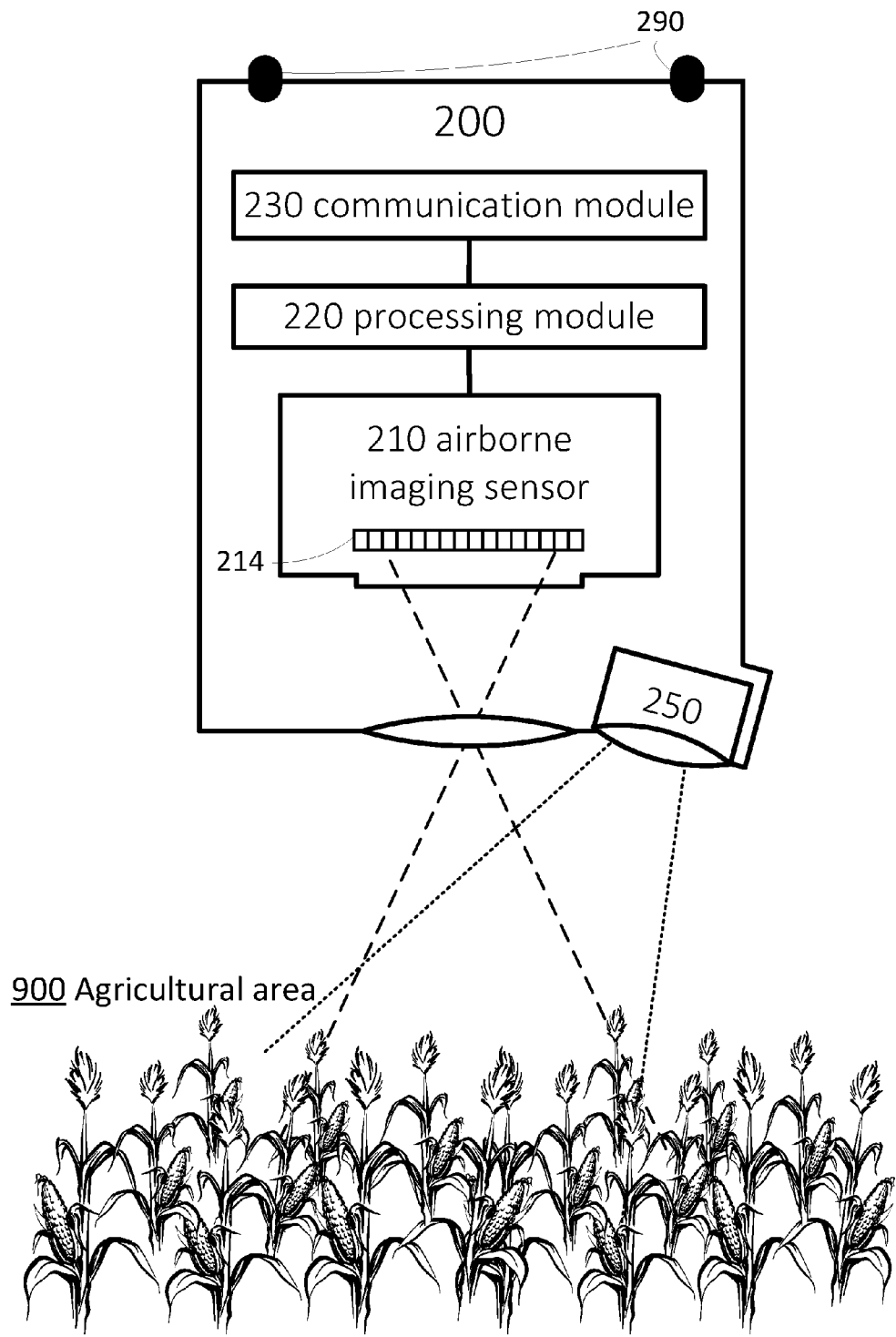

In the example of FIG. 11C, motion compensation is achieved using illumination. Optionally, system 200 includes illumination unit 250 (e.g. a projector and/or a flash unit) which is configured and operable to illuminate the crops during acquisition of image data by the airborne imaging sensor. For example, LED (light emitting diode) illumination may be used. The illumination may be used for compensating for the motion of the airborne imaging sensor with respect to the crops during the acquiring. Various types of illumination may be used (e.g. depending on the relative importance of energy consumption considerations with respect to other design factors of system 200). It is noted that using flash illumination may be used in order to decrease the time in which light sensitive surface 214 of imaging sensor 210 should be exposed to light from agricultural area 900 in order to yield an image, which in turn reduces effects of motion blur on the resulting image data.

Figure 11D:
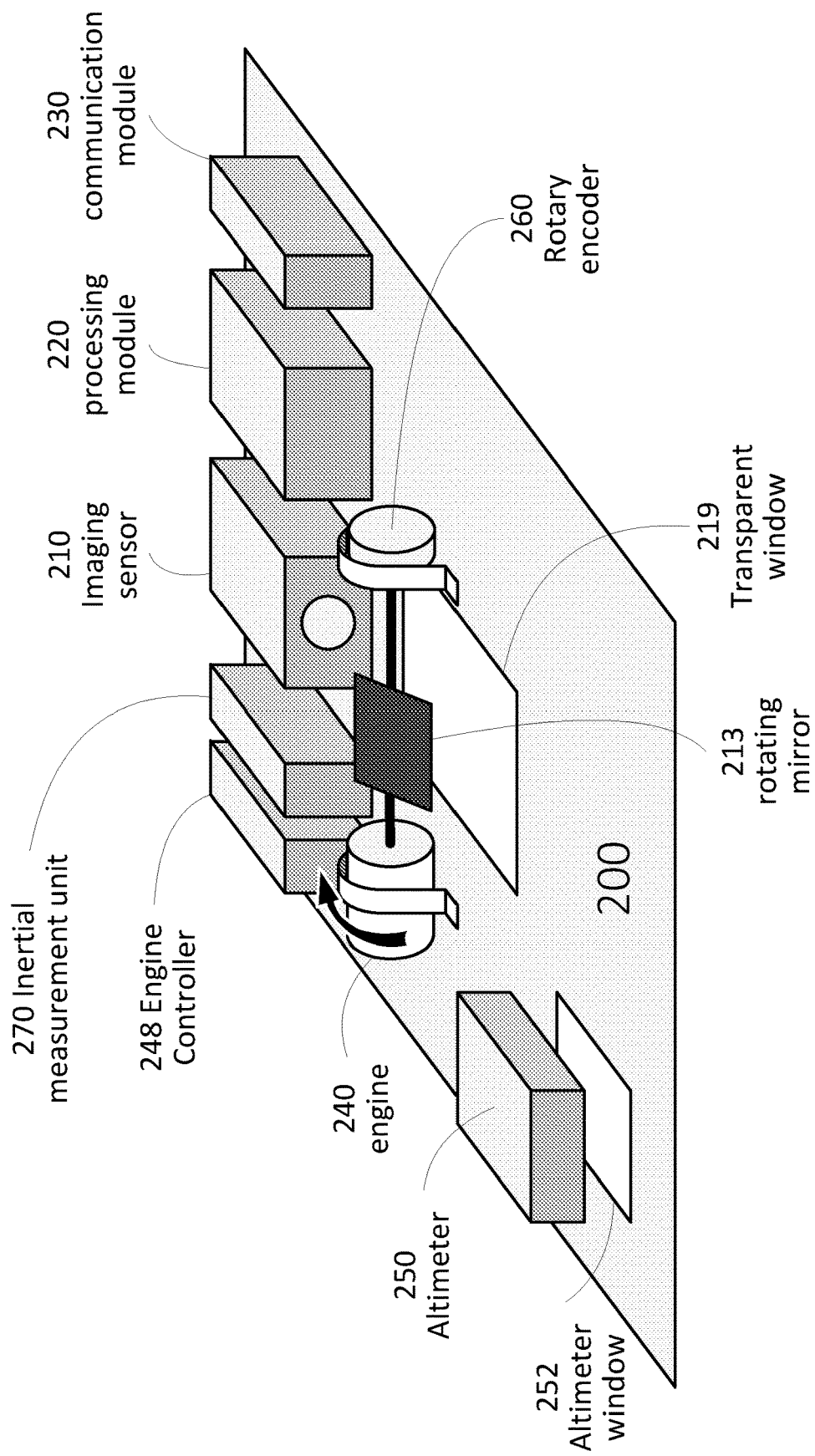

In the example of FIG. 11D, agricultural monitoring system 200 includes an altimeter 250. For example, altimeter 250 may be a laser altimeter, whose laser beam traverses through a corresponding window of agricultural monitoring system 200 (denoted "altimeter window 252). System 200 may further include an inertial measurement unit (IMU) 270, which measures and reports on the aircraft's velocity, orientation, and gravitational forces, using a combination of one or more accelerometers, gyroscopes, and/or magnetometers. System 200 may also include a rotary encoder 230, which measures a rotation rate for a rotating mirror 213 (or for a rotating mirror prism 212, as discussed above).

Information from IMU 270, altimeter 250 and rotary encoder 260 may be used by engine controller 248 to determine rotation speed for engine 240 (and thereby to the rotating mirror).

It is noted that the angular velocity of the imaging plane (e.g. that of transparent window 219 which transfers light from agricultural area 900 towards imaging sensor 210)

depends on various factors, which include the airspeed of the aircraft, its pitch angle, and its height above the agricultural area 900. Furthermore, information from a laser altimeter may also require correction based on pitch and tilt angles data.

Optionally, the rotation axis of the rotating mirror 213 is parallel to the horizon, and perpendicular to the main axis of the aircraft. However, as the aircraft flight direction is not necessarily parallel to the main axis of the aircraft (e.g. it may drift because of crosswind, or for maneuvering reasons), system 200 may also compensate for the component perpendicular to the main axis of the aircraft.

Figure 12:
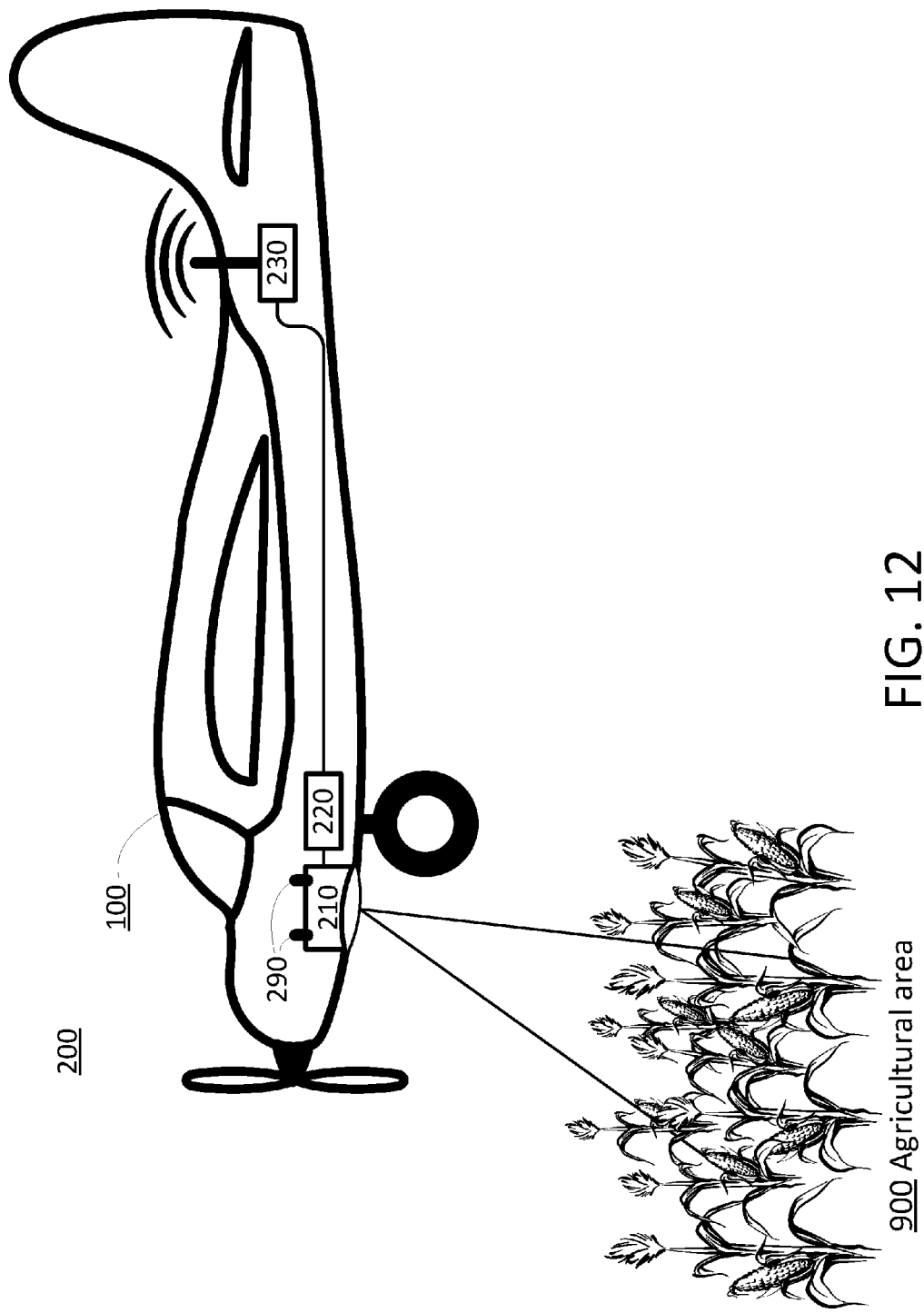
FIG. 12 is a functional block diagram illustrating an example of an agricultural monitoring system, in accordance with examples of the presently disclosed subject matter.

FIG. 12 is a functional block diagram illustrating an example of agricultural monitoring system 200, in accordance with examples of the presently disclosed subject matter. As mentioned above, optionally agricultural monitoring system 200 may include an airborne areal platform 100 which is operable to fly the airborne imaging sensor along a flight path over an agricultural area.

Different types of airborne platforms may be used as airborne platform 100. For examples, airborne platform 100 may be an airborne platform of any one of the following airborne platform types: an airplane, a helicopter, a multi-rotor helicopter (e.g. a quadcopter), an unmanned aerial vehicle (UAV), a powered parachute (also referred to as motorized parachute, PPC, and paraplane), and so on. The type of airborne platform 100 may be determined based on various considerations, such as aerodynamic parameters (e.g. velocity, flight altitude, maneuvering capabilities, stability, carrying capabilities, etc.), degree of manual control or automation, additional uses required from the airborne platform, and so on.

Optionally, the airborne platform 100 included in system 200 may include an engine, operable to propel the airborne platform 100 during its flight. Optionally, the airborne platform 100 included in system 200 may include wings (whether fixed or rotating), operable to provide lift to the airborne platform 100 during its flight.

FIG. 15 is a flow chart illustrating an example of method 1100 for agricultural monitoring, in accordance with examples of the presently disclosed subject matter. Referring to the examples set forth with respect to the previous drawings, method 1100 may be executed by server 300. Referring to method 500, it is noted that execution of method 1100 may initiate after stage 540 of transmitting the image data content is concluded, but may also initiate during the execution of stage 540. That is, the server may start receiving, processing and utilizing some image data content, before all of the image data content is generated by the airborne system. This may be the case, for example, if the airborne system processes and transmits image data content during the acquisition flight.

Method 1100 starts with stage 1110 of receiving image data content which is based on image data of an agricultural area, wherein the image data is a submillimetric image resolution image data acquired by an airborne imaging sensor at a set of imaging locations along a flight path extending over the agricultural area. Referring to the examples set forth with respect to the previous drawings, the image data content received in stage 1110 may be some or all of the image data content transmitted in stage 540 of method 500, and/or some or all of the image data content transmitted by communication module 230 of system 200. Stage 1110 may be executed by communication module 310 of server 300.

Method 1100 continues with stage 1120 of processing the image data content to generate agronomic data which includes agronomic image data. Referring to the examples set forth with respect to the following drawing, stage 1120 may be executed by server processing module 320. It is noted that different types of processing of the image data content may be executed in stage 1120. Especially, any processing technique discussed with respect to stage 550 may be included in stage 1120.

Optionally, the processing of stage 1120 may include analyzing the image data content for identifying selected agronomic significant data within the image data content; and processing the agronomic significant data to provide the agronomic data.

Optionally, the processing of stage 1120 may include applying computerized processing algorithms to the image data content for detecting leaves diseases or indication of parasites effect on the leaves in one or more plants in the agricultural area.

Stage 1130 of method 1100 includes transmitting the agronomic data to an end-user remote system. Referring to the examples set forth with respect to the following drawing, stage 1130 may be executed by communication module 310 of server 300.

Referring to the examples set forth with respect to the previous drawings, the agronomic data transmitted in stage 1130 may be transmitted to various entities such as agricultural airplane 991, agronomist 992, and/or farmer 993.

It is noted that method 1100 executed by a server (such as server 300) which supports the various variations discussed with respect to method 500. For example, with respect to detecting growth of crops in the agricultural area, the receiving of stage 1110 may include receiving image data content of the agricultural area acquired (by at least one imaging sensor) at different days (which may extend over several weeks), and the processing of stage 1120 may include processing the image data content for determining growth parameters for the plants in the agricultural area.

With respect to another example of monitoring agricultural areas of multiple entities, it is noted that optionally, the image data content may include first image data content of a first agricultural property of a first owner, and second image data content of a second agricultural property of a second owner other than the first owner; and the transmitting of stage 1130 may include transmitting the first image data content in a first message, and transmitting the second data content in a second message. Each of the first message and the second message may include information identifying the owner of the respective agricultural property, and/or may be addressed to a system and/or another entity associated with the respective owner.

Method 1100 may further include a stage of applying computerized processing algorithms to agronomic data for selecting, out of a plurality of possible recipients, a recipient for the agronomic image data, based on agronomic expertise of the possible recipients. The transmitting of stage 1130 may be executed based on results of the selecting.

FIG. 16 is a functional block diagram illustrating an example of server 300 used for agricultural monitoring, in accordance with examples of the presently disclosed subject matter. Server 300 may include communication module 310 and server processing module 320, as well as additional components omitted for reasons of simplicity (e.g. power source, user interface, etc.).

As discussed above in great detail, the image data content received may be based on image data obtained in low flight over the agricultural area. Especially, the image data content may be based on image data acquired at a set of imaging locations along the flight path which are located less than 20 meters above the top of the crops growing in the agricultural area.

The systems and methods discussed above where described in the context of monitoring an agricultural area in which crops grow. It will be clear to a person who is of skill in the art that these methods and systems may also be useful (e.g. ergonomically useful) also for monitoring ground areas which do not currently have any crops growing on them. For example, such systems and methods may be used to determine the types of soils in these grounds, their material composition, the irrigation level in these areas, to identify parasites or weeds, and so on. It is therefore noted that the systems described above may be adapted to monitor ground areas with or without crops, mutatis mutandis. Also, the methods described above may be adapted to monitor ground areas with or without crops, mutatis mutandis. In both case, the imaging of the ground area is still done in submillimetric resolution, and may be implemented in any of the ways discussed above (e.g. utilizing motion compensation, etc.). Few examples are provided with respect to FIGS. 17, 18 and 19.

Figure 17:
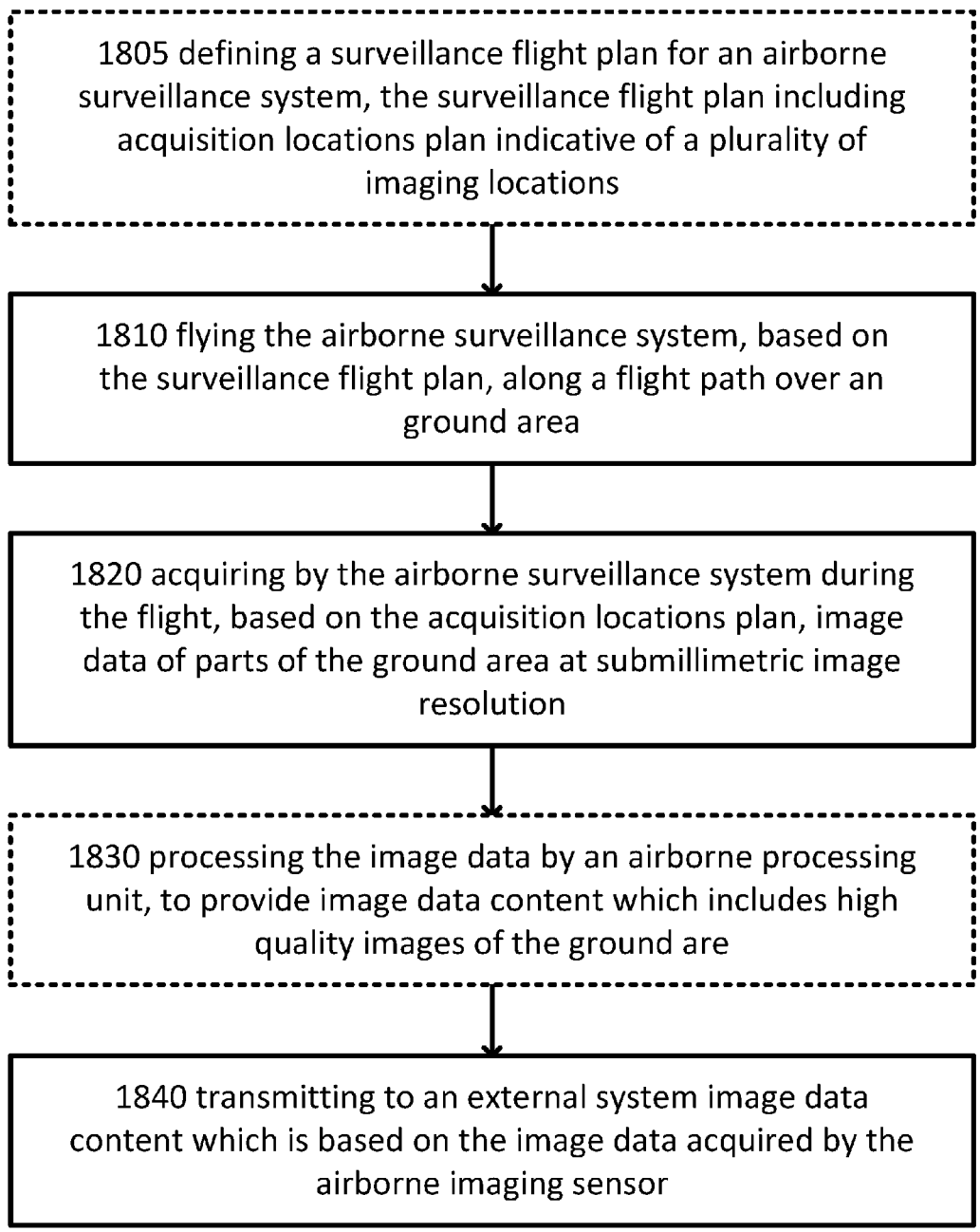
FIG. 17 is a flow chart illustrating an example of a method for monitoring of ground areas, in accordance with examples of the presently disclosed subject matter.

FIG. 17 is a flow chart illustrating an example of method 1800 for monitoring of a ground area, in accordance with examples of the presently disclosed subject matter. Referring to the examples set forth with respect to the previous drawing, method 1800 may be executed by system 10.

Method 1800 includes a stage of defining a surveillance flight plan (stage 1805 which is discussed below), which are followed by acquiring and utilizing image data of a ground area, based on the surveillance flight plan. The stages of method 1800 which follow stage 1805 may be variations of the corresponding stages of method 500 (corresponding stages of these two methods are numbered in corresponding reference numerals, i.e. stage 1810 corresponds to stage 510, stage 1820 corresponds to stage 520, and so on)—with the modification that the ground area is not necessarily an agricultural area in which crops grow. For example—it may be an agricultural area before (or after) crops grow in it (e.g. after seeding), a ground area adjacent to an agricultural area (and which may affect the ground area, e.g. because of dust or parasites), or another type of ground area.

It is noted that variations and examples discussed with reference to method 500 are also relevant for method 1800, where applicable, mutatis mutandis. Where applicable, the relevant variations of stages 510, 520 and possibly also 530, 540 and following stages, may be implemented in the corresponding stages of method 1800 (i.e. 1810, 1820, and so on) as executed based also on the surveillance flight plan defined in stage 1805—with the modification that the ground area is not necessarily an agricultural area in which crops grow.

Stage 1805 of method 1800 includes defining a surveillance flight plan for an airborne surveillance system, the surveillance flight plan including acquisition locations plan indicative of a plurality of imaging locations.

Referring to the examples set forth with respect to the previous drawings, stage 1805 may be executed by different entities, such as airborne system 10, server 300, and end-user device (e.g. of agronomist 992, of farmer 993, of a not-illustrated planning center, and so on), or any combination thereof (e.g. a plan may be suggested by agronomist 992, and then revised by the airborne system 10 based on meteorological conditions).

The defining of stage 1805 may be based on various considerations. For example, the surveillance flight path and possibly additional parameters may be defined so as to enable image acquisition at the required qualities. Stage 1805 may include, for example, the following substages:

Based on information obtained from the client, defining the desired one or more ground areas;

Receiving geographic information system (GIS) information of the one or more ground areas, as well as information regarding the structure of the one or more ground areas (such as information GIS information regarding irrigation pipes, roads or other aspects of the structure).

Optionally, receiving information regarding the soil in the ground area, such as type of soil, variety, etc.

Based on the GIS information (possibly using also additional information), defining topography and obstacles in each of the one or more ground areas and around the one or more ground areas, such as irrigation systems deployed in the field, high trees electricity lines, fixed machinery and others.

Defining a surveillance flight path plan using a flight plan tool, the surveillance flight plan being defined with respect to each of the one or more ground areas (or subdivisions thereof). It is noted that optionally, general guidelines may be included for different types of soils or for other distinct subareas in the one or more ground areas It is noted that the surveillance flight plan may be updated. For example, on the day of the actual flight (if the surveillance flight plan is defined in advance), the flight crew and/or local contact may reach the ground area, and verify obstacles for low flight, cheek wind for optimizing flight routes by flying head or tail wind (e.g. preferably taking photos with head wind, rather than cross wind).

Stage 1810 of method 1800 includes flying the airborne surveillance system, based on the surveillance flight plan, along a flight path over a ground area (the term "ground area" is explained in the previous paragraphs). Referring to the examples set forth with respect to the previous drawings, the airborne surveillance system may be imaging sensor 210 or the entire airborne system 10 (with the modification that the ground area is not necessarily an agricultural area in which crops grow), and the flying of stage 1810 may be executed by airborne platform 100. It is noted that all the optional variations, implementations and sub-stages discussed with respect to stage 510 may be adapted to pertain to stage 1810, which is executed based on the surveillance flight plan.

Stage 1820 of method 1800 includes acquiring by the airborne surveillance system during the flight, based on the acquisition locations plan, image data of parts of the ground area at submillimetric image resolution. Referring to the examples set forth with respect to the previous drawings, the airborne surveillance system may be imaging sensor 210 or the entire airborne system 10 (with the modification that the ground area is not necessarily an agricultural area in which crops grow). It is noted that all the optional variations, implementations and sub-stages discussed with respect to stage 520 may be adapted to pertain to stage 1820, which is executed based on the surveillance flight plan.

Method 1800 may include optional stage 1830, which includes processing the image data by an airborne processing unit, to provide image data content which includes high quality images of the ground and/or of objects laying on the ground (or partially exposed of the ground). For example, a clod of earth, a small piece of earth (e.g. 2 cm by 2 cm), organic layers or residue (O soil horizon, including L, F, and/or H layers), topsoil (A soil horizon), a rock, a stone, a pipeline, a sprinkler, living animals (e.g. insects, worms, parasites, etc.), and so on.

The airborne processing unit of stage 1830 is carried by the same airborne platform which flies the airborne surveillance system over the ground area. Referring to the examples set forth with respect to the previous drawings, stage 1830 may be carried out by a processor of the system of stage 1810 (e.g. processor 220, mutatis mutandis). It is noted that all the optional variations, implementations and sub-stages discussed with respect to stage 530 may be adapted to pertain to stage 1830.

Stage 1830 may be executed based on the surveillance flight plan defined in stage 1805, but this is not necessarily so. For example, the processing of optional stage 1830 may be based on information regarding the type of soil or of types of agricultural conditions looked for (e.g. soil humidity, ground evenness, and so on), which is included in the surveillance flight plan. It is noted that the surveillance flight plan (or a more general plan defined for the surveillance flight, a plan which includes the surveillance flight plan as well as additional information) may include parameters and/or instructions which affect the processing of optional stage 1830 (e.g. instructions as of to how much information should be transmitted to an external system in stage 1840).

It is noted that method 1800 may also include processing of the image data for providing other decision facilitating information, similarly to the processing discussed with respect to stage 550 (e.g. with respect to stage 551), mutatis mutandis. Like stage 1830, such processing of the image data may be based on the surveillance flight plan, but this is not necessarily so.

Stage 1840 of method 1800 includes transmitting to an external system image data content which is based on the image data acquired by the airborne surveillance system. Referring to the examples set forth with respect to the previous drawings, the transmitting of stage 1840 may be executed by communication module 230, mutatis mutandis. It is noted that all the optional variations, implementations and sub-stages discussed with respect to stage 520 may be adapted to pertain to stage 1820, mutatis mutandis, which is executed based on the surveillance flight plan.

Method 1800 may also include stages 1850, 1860, 1870, 1880 and 1890, which correspond to stages 550, 560, 570, 580 and 590 respectively (with the modification that the ground area is not necessarily an agricultural area in which crops grow). Each out of stages 1850, 1860, 1870, 1880 and 1890 may include sub-stages which correspond to the previously discussed sub-stages of the corresponding stages 550, 560, 570, 580 and 590 of method 500 (with the modification that the ground area is not necessarily an agricultural area in which crops grow). Each one of stages 1850, 1860, 1870, 1880 and 1890 (and their sub-stages) may be based on the surveillance flight plan defined in stage 1805, but this is not necessarily so.

Referring to method 1800 as a while, method 1800 (and particularly also the designing of the surveillance flight plan) may be used, for example, in order to see if a seeded agricultural area already sprouted, whether a ground area is suitable for agricultural use, in order to determine that pipelines and/or watering systems and/or irrigation systems and/or other agricultural systems are functioning, and so on.

For example, the ground area may include different types of soil, and the acquiring may include acquiring image data of different locations in the ground area, for generating a soil map of the ground area (e.g. either on the airborne platform and/or on a ground system).

For example, the acquiring may include acquiring image data which is indicative of material composition of different locations in the ground area. Such material composition may include to different types of ground and/or stones, different types of minerals, and so on.

For example, the acquiring may include acquiring image data which is indicative of agricultural preparedness level of different locations in the ground area.

It is noted that more than one type of soil (or other objects in, on or partly exposed of the ground) may be present in the ground area. Stage 1805 may include defining different acquisition parameters for imaging locations associated with different types of ground (or other objects such as those previously mentioned in this paragraph).

Such acquisition parameters may include operational parameters of the airborne platform (e.g. velocity, altitude above ground level, stability, etc.) and/or parameters of the airborne surveillance system and especially of its sensor (e.g. exposure time, f-number, lens focal length, resolution, detector sensitivity, speed compensation, etc.).

Figure 18:
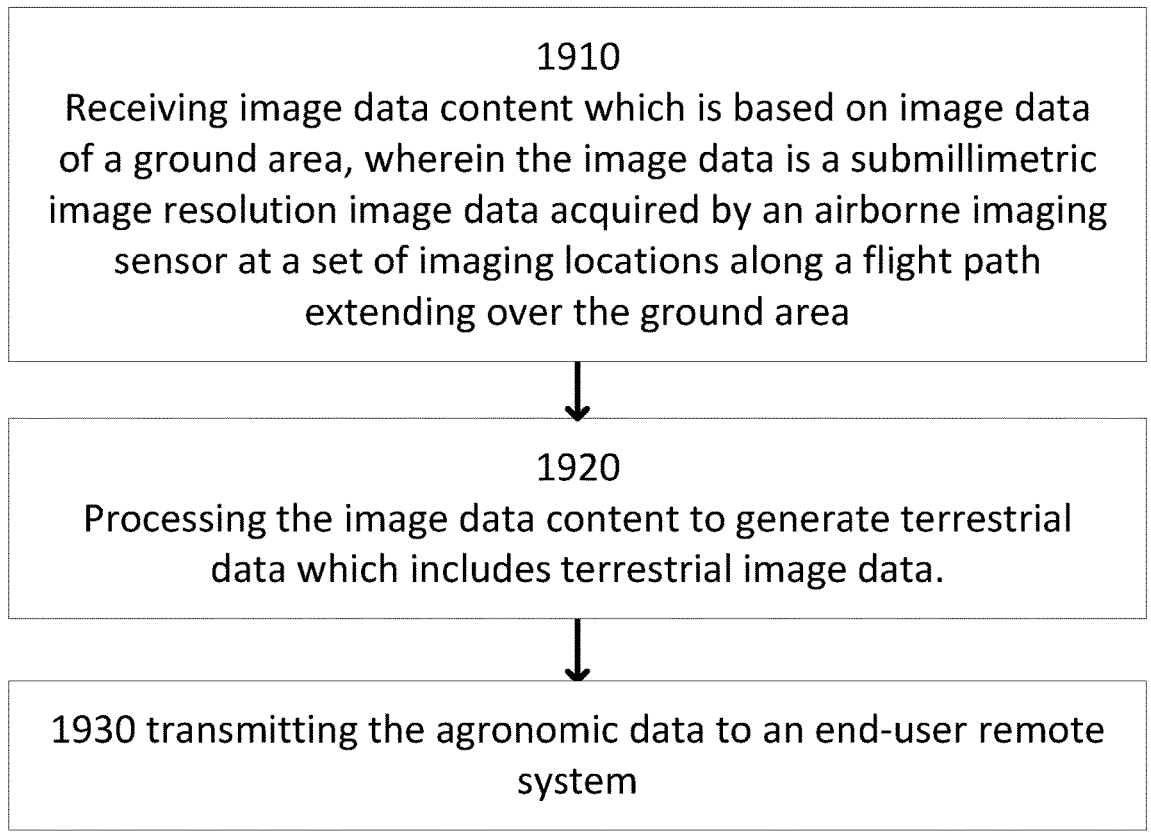
FIG. 18 is a flow chart illustrating an example of a method for monitoring of a ground area, in accordance with examples of the presently disclosed subject matter.
Figure 19:
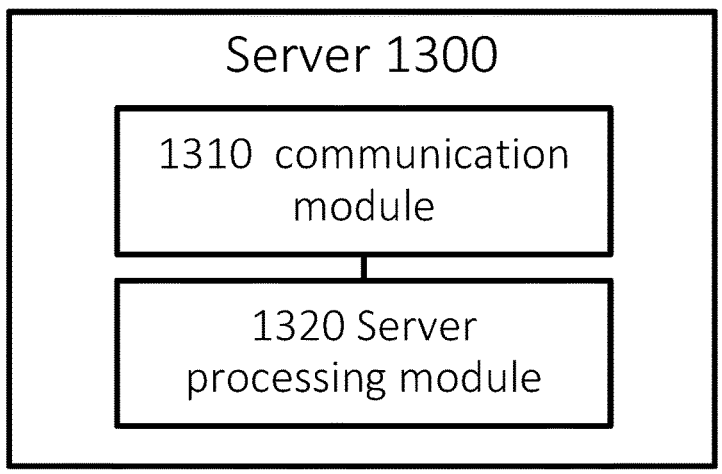
FIG. 19 is a functional block diagram illustrating an example of a server used for monitoring of a ground area, in accordance with examples of the presently disclosed subject matter.

FIG. 18 is a flow chart illustrating an example of method 1900 for agricultural monitoring, in accordance with examples of the presently disclosed subject matter. Referring to the examples set forth with respect to the following drawings, method 1900 may be executed by server 1300.

Referring to method 1800, it is noted that execution of method 1900 may initiate after stage 1840 of transmitting the image data content is concluded, but may also initiate during the execution of stage 1840. That is, the server may start receiving, processing and utilizing some image data content, before all of the image data content is generated by the airborne system. This may be the case, for example, if the airborne system processes and transmits image data content during the acquisition flight.

Method 1900 starts with stage 1910 of receiving image data content which is based on image data of a ground area, wherein the image data is a submillimetric image resolution image data acquired by an airborne imaging sensor at a set of imaging locations along a flight path extending over the ground area. Referring to the examples set forth with respect to the previous drawings, the image data content received in stage 1910 may be some or all of the image data content transmitted in stage 1840 of method 1800, and/or some or all of the image data content transmitted by communication module 230 of system 200 (mutatis mutandis). Stage 1910 may be executed by communication module 1310 of server 1300.

Method 1900 continues with stage 1920 of processing the image data content to generate terrestrial data which includes terrestrial image data. Referring to the examples set forth with respect to the following drawing, stage 1920 may be executed by server processing module 320 (mutatis mutandis). It is noted that different types of processing of the image data content may be executed in stage 1920. Especially, any processing technique discussed with respect to stage 550 may be included in stage 1920.

The term "terrestrial data" pertains to data which relates to land and/or to ground. In some implementations of the invention, the term "terrestrial data" may be construed broadly to also include objects which touch the ground, whether living objects (e.g. worms, fallen leaves) or inanimate objects (e.g. pipelines, sprinklers). However, some implementation of method 1900 (and of server 1300) are implemented in a stricter sense, in which the term "terrestrial data" pertains only to the ground itself (topsoil, stones, etc.).

Optionally, the processing of stage 1920 may include analyzing the image data content for identifying selected agronomic significant data within the image data content; and processing the agronomic significant data to provide the terrestrial data. For example, such selected agronomic data may be selecting images which clearly show the type of ground, images in which parasites, worms, or other living creatures are shown, images in which rupture or wear of pipelines are shown, and so on.

Optionally, the processing of stage 1920 may include analyzing the image data content for identifying selected terrestrial significant data within the image data content; and processing the terrestrial significant data to provide the terrestrial data. For example, the selected terrestrial significant data may include images in which the type of ground is shown, images which are indicative of the content of lower layers of soil (lower than the topsoil) which may be exposed in some areas, and so on.

Optionally, the processing of stage 1920 may include applying computerized processing algorithms to the image data content for differentiating between areas with different types of soils in the ground area. The different types of soil may be different types of earth, of rocks, of stones and/or of other minerals.

Optionally, the processing of stage 1920 may include determining a composition of materials in the ground area, and generating the terrestrial data in response to a result of the determining.

Stage 1930 of method 1900 includes transmitting the terrestrial data to an end-user remote system. Referring to the examples set forth with respect to the following drawing, stage 1930 may be executed by communication module 1310 of server 1300.

Referring to the examples set forth with respect to the previous drawings, the terrestrial data transmitted in stage 1930 may be transmitted to various entities such as agricultural airplane 991, agronomist 992, soil scientist, geologist, and/or farmer 993.

It is noted that method 1900 may be executed by a server (such as server 1300) which supports the various variations discussed with respect to method 1800, mutatis mutandis.

Method 1900 may further include a stage of applying computerized processing algorithms to terrestrial data for selecting, out of a plurality of possible recipients, a recipient for the terrestrial image data, based on terrestrial expertise of the possible recipients. The transmitting of stage 1930 may be executed based on results of the selecting.

Referring to method 1900 generally, it is noted that the image data content may be based on image data acquired at a set of imaging locations along the flight path which are located less than 20 meters above the ground area.

FIG. 16 is a functional block diagram illustrating an example of server 300 used for agricultural monitoring, in accordance with examples of the presently disclosed subject matter. Server 1300 may include communication module 1310 and server processing module 1320, as well as additional components omitted for reasons of simplicity (e.g. power source, user interface, etc.).

As discussed above in great detail, the image data content received may be based on image data obtained in low flight over the ground area. Especially, the image data content may be based on image data acquired at a set of imaging locations along the flight path which are located less than 20 meters above the ground of the ground area.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

What is claimed is:

1. A method for agricultural monitoring, the method comprising: flying an airborne imaging sensor along a flight path over an agricultural area in which crops grow; acquiring by the airborne imaging sensor image data of parts of the agricultural area, wherein the acquiring of the image data is executed at a set of imaging locations along the flight path which enable acquisition of the image data at submillimetric image resolution and wherein the acquiring comprises acquiring image data at the set of imaging locations while flying the airborne imaging sensor along the imaging locations at velocities which do not fall below 50% of the average speed of the airborne platform along the flight path, the acquiring further comprising mechanically rotating at least one optical component of the airborne imaging sensor with respect to a carrying airborne platform, for compensating for the motion of the airborne imaging sensor with respect to the crops during the acquiring; and concurrently to the rotation of the at least one optical component, for each frame out of a plurality of frames of the image data: initiating a focusing process of the imaging sensor when an acquisition optical axis is at a degree wider than 20° from the vertical axis, and acquiring the image data using vertical imaging, when the acquisition optical axis is at a degree smaller than 20° from the vertical axis; applying computerized processing algorithms to the image data content for detecting leaves diseases or indication of parasites effect on the leaves, in one or more plants in the agricultural area, or applying computerized processing algorithms to the image data for identifying selected agronomic significant data, and generating agronomic image data for transmission to a remote system based on the selected agronomic significant data, or applying computerized processing algorithms to the selected agronomic significant data for selecting, out of a plurality of possible recipients, a recipient for the agronomic image data, based on agronomic expertise of the possible recipients; and transmitting to an external system image data content which is based on the image data acquired by the airborne imaging sensor.

2. The method according to claim 1, the method comprising transmitting the image data content to the external system for displaying to an agronomist at a remote location agronomic image data which is based on the image data content, thereby enabling the agronomist to remotely analyze the agricultural area.

3. The method according to claim 1, wherein the flight path is a terrain following flight path.

4. The method according to claim 1, wherein the acquiring comprises mechanically moving at least one component of the airborne imaging sensor with respect to a carrying airborne platform, for compensating for the motion of the airborne imaging sensor with respect to the crops during the acquiring.

5. The method according to claim 1, wherein the acquiring comprises illuminating the crops during the acquiring, for compensating for the motion of the airborne imaging sensor with respect to the crops during the acquiring.

6. The method according to claim 1, wherein flying comprises flying the airborne imaging sensor along a flight path which extends over at least a first agricultural property of a first owner and a second agricultural property of a second owner other than the first owner, wherein the method comprises acquiring first image data of parts of first agricultural property and acquiring second image data of parts of the second agricultural property; generating first image data content based on the first image data and generating second image data content based on the second image data; for providing the first image data content to a first entity in a first message, and for providing the second data content to a second entity in a second message.

7. The method according to claim 1, wherein the acquiring comprises acquiring image data of parts of the agricultural area which are inaccessible to land vehicles.

8. The method according to claim 1, wherein flying comprises flying the imaging sensor by an agricultural aircraft which is configured for aerial application of crop protection products.

9. The method according to claim 8, further comprising selecting aerial application parameters for aerial application of crop protection products by the agricultural aircraft based on processing of the image data.

10. The method according to claim 1, wherein the set of imaging locations along the flight path are located less than 20 meters above the top of the crops growing in the agricultural area.

11. The method according to claim 1, wherein the transmitting is followed by subsequent instance of the flying, the acquiring and the transmitting, wherein the method further comprises planning a path for the subsequent instance of flying, based on the image data acquired in a previous instance of acquiring.

12. The method according to claim 1, wherein the flying, the acquiring and the transmitting are reiterated over multiple weeks, wherein the method further comprises processing image data acquired at different times over the multiple weeks, for determining growth parameters for the plants in the agricultural area.

13. The method according to claim 1, wherein the flying is preceded by defining a surveillance flight plan for an airborne surveillance system, the surveillance flight plan comprising acquisition locations plan indicative of a plurality of imaging locations, wherein the flying of the airborne sensor is part of flying the airborne surveillance system along a flight path over an agricultural area, based on the surveillance flight plan.

14. The method according to claim 1, wherein the flight path is a terrain following flight path; wherein flying comprises flying the imaging sensor by an agricultural aircraft which is configured for aerial application of crop protection products; wherein the set of imaging locations along the flight path are located less than 20 meters above the top of the crops growing in the agricultural area; wherein the acquiring comprises: (a) acquiring image data at the set of imaging locations while flying the airborne imaging sensor along the imaging locations at velocities which do not fall below 50% of the average speed of the airborne platform along the flight path; and (b) compensating for the motion of the airborne imaging sensor with respect to the crops during the acquiring, by illuminating the crops during the acquiring and by mechanically moving at least one component of the airborne imaging sensor with respect to a carrying airborne platform; wherein the transmitting comprises transmitting the image data content to the external system for displaying to an agronomist at a remote location agronomic image data which is based on the image data content, thereby enabling the agronomist to remotely analyze the agricultural area; wherein the method further comprises: prior to the flying, defining a surveillance flight plan for an airborne surveillance system, the surveillance flight plan comprising acquisition locations plan indicative of a plurality of imaging locations, wherein the flying of the airborne sensor is part of flying the airborne surveillance system along a flight path over an agricultural area, based on the surveillance flight plan; wherein the image data comprises photographs and/or videos.

* * * * *